United States Patent [19]

Kato

[11] Patent Number: 5,409,795
[45] Date of Patent: Apr. 25, 1995

[54] PROCESS OF PRODUCING NONAQUEOUS RESIN DISPERSION AND LIQUID DEVELOPER FOR ELECTROSTATIC PHOTOGRAPHY

[75] Inventor: Eiichi Kato, Shizuoka, Japan

[73] Assignee: Fuji Photo Film Co., Ltd., Kanagawa, Japan

[21] Appl. No.: 158,588

[22] Filed: Nov. 29, 1993

[30] Foreign Application Priority Data

Nov. 27, 1992 [JP] Japan .................................. 4-339436

[51] Int. Cl.⁶ ............................................. G03G 9/135
[52] U.S. Cl. ..................................... 430/115; 430/114
[58] Field of Search ............................... 430/114, 115

[56] References Cited

U.S. PATENT DOCUMENTS 3,990,980 11/1976 Kosel ..................................... 430/114
4,618,557 10/1986 Dan et al. ............................. 430/114

FOREIGN PATENT DOCUMENTS 60-185962 9/1985 Japan .
1-282566 11/1989 Japan .

*Primary Examiner*—Roland Martin
*Attorney, Agent, or Firm*—Sughrue, Mion, Zinn, Macpeak & Seas

[57] ABSTRACT

A process of producing a nonaqueous resin dispersion, particularly useful for a liquid developer in electrostatic photographic, which comprises subjecting to photopolymerization a system containing at least a monomer (A) having one polymerizable double bond, which is soluble in a nonaqueous solvent but becomes insoluble upon polymerization thereof, and at least a dispersion stabilizing resin (P) which is a polymer having a weight average molecular weight of from $1 \times 10^4$ to $1 \times 10^6$ and containing a specific repeating unit represented by formula (I) in an amount of at least 50% by weight based on the weight of the polymer and has a specific functional group represented by formula (II) bonded to the side chain of the polymer and/or only one terminal of the main chain of the polymer, the photopolymerization reaction being carried out in the nonaqueous solvent by irradiating the system with ultraviolet rays having a wavelength of not longer than 400 n.m.:

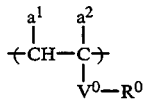

(I)

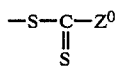

(II)

10 Claims, No Drawings

PROCESS OF PRODUCING NONAQUEOUS RESIN DISPERSION AND LIQUID DEVELOPER FOR ELECTROSTATIC PHOTOGRAPHY

FIELD OF THE INVENTION

The present invention relates to a process of producing a nonaqueous resin dispersion useful for a liquid developer for electrostatic photography, a printing ink, a coating material, etc., and to a liquid developer for electrostatic photography prepared using the nonaqueous resin dispersion.

BACKGROUND OF THE INVENTION

Nonaqueous dispersed resin particles being used as a liquid developer for electrostatic photography, a printing ink, a coating material, etc., are the particles of a resin capable of fixing the coexisting pigment or dye as a film thereof and are required to be fine particles and stably dispersed. In particular, since the resin particles dispersed in a nonaqueous solvent having a high electric resistant give influences on image qualities of the developed images, the dispersed resin particles are required to have a good dispersibility.

As a process of producing the nonaqueous dispersed resin particles, a so-called nonaqueous dispersion polymerization reaction wherein a monomer which is soluble in a nonaqueous dispersing solvent and becomes insoluble upon polymerization is granulated by a polymerization reaction in the nonaqueous dispersing solvent and in the presence of a dispersion stabilizing resin soluble in the solvent to provide a nonaqueous resin dispersion containing the particles, is known and various processes are proposed, for example, in K. E. J. Barrett, *Dispersion Polymerization in Organic Dedia*, published by John Wiley & Sons, 1975; Sooichi Muroi, *Cho Biryushi Polymer no Saisentan Gijutu (Highest Technology of Super Fine Particle Polymer)*, Chapter 2, published by C M C K.K., 1991; etc.

According to the nonaqueous dispersion polymerization reaction, the improvement of productivity such as saving of energy consumption, simplification of steps involved, etc., is attained and a particle dispersion having preferred characteristics such as fine particle sizes and a narrow particle distribution can be obtained as compared to a so-called mechanical process through kneading, grinding, and wet dispersion steps.

However, when bonding of the soluble dispersion stabilizing resin and the insoluble dispersed resin particles is insufficient, the dispersion stabilizing resin tends to diffuse in the solution, whereby the dispersion stabilizing resin is released from the resin particles after storage or repeated use of the resin particle dispersion for a long period of time, causing precipitation, aggregation, and using such dispersed resin particles for a liquid developer, since the resin particles once aggregated and accumulated are reluctant to redisperse, the particles attach to everywhere of a developing machine, which results in staining of images and machine troubles of the developing machine such as clogging of a liquid-sending pump, etc.

For overcoming these defects, a means of chemically bonding the soluble dispersion stabilizing resin and insoluble latex particles is proposed as disclosed in U.S. Pat. No. 3,990,980.

That is, according to the disclosed process, dodecyl methacrylate is copolymerized with glycidyl methacrylate having a polymerizable double bond group to synthesize a random copolymer soluble in a nonaqueous solvent, esterifying the random copolymer by a high-molecular reaction with methacrylic acid to provide a dispersion stabilizing resin having introduced therein a methacryloyloxy group, and subjecting the dispersion stabilizing resin to a polymerizing gradulation reaction.

However, in a liquid developer using the dispersed resin particles thus obtained by the foregoing process, the dispersion stability to the spontaneous precipitation of the dispersed resin particles is improved to some extent but the improvement is yet insufficient. When the liquid developer containing the dispersed resin particles is used for a developing apparatus, there is a problem that the liquid developer is insufficient in redispersion stability to put in practical use, such that the toners (dispersed resin particles) attached to each part of the developing apparatus are solidified in the form of film, which is not liable to redisperse and further causes machine troubles, staining of copy images, etc.

Also, in the production process of resin particles described in the foregoing U.S. patent, for producing monodisperse particles having a narrow particle distribution, there is a great restriction on the combination of a dispersion stabilizing resin being used and a monomer being insolubilized, and in general, resin particles having a wide particle distribution containing a large amount of coarse particles or polydisperse resin particles having at least 2 mean particle sizes are formed. Also, in the production process, it is difficult to obtain monodisperse resin particles having a narrow particle distribution and a desired mean particle size, and large resin particles having particle sizes of at least 1 $\mu$m and very fine resin particles having particle sizes of smaller than 0.1 $\mu$m are formed. Furthermore, in the foregoing production process, there is a problem that the dispersion stabilizing resin being used must be produced by a complicated production process requiring a long period of time.

For solving these problems, a process of using the dispersion stabilizing resin obtained by a process wherein in the polymer as described above, the polymerizable double bond group being bonded to the polymer of the dispersion stabilizing resin is bonded parting from the polymer main chain with at least 10 total atoms such that the copolymerization reactivity with the monomer which becomes the dispersed resin particles by being solubilized is not sterically hindered (e.g., U.S. Pat. No. 4,618,557 and JP-A-60-185962 ("JP-A" as used herein means an "unexamined published Japanese patent application")), a process of introducing the polymerizable double bond group to one end only of the polymer main chain of the soluble polymer (e.g., JP-A-1-282566), etc., is disclosed.

As described above, it is important that in the nonaqueous dispersed resin particles having a good dispersion stability, the dispersion stabilizing resin is efficiently bonded to the component becoming an insoluble resin by causing a reaction in the polymerizing granulation reaction such that they are not separated even in a severe using condition.

In the conventional known process as described above, the polymerizing granulation of a dispersion stabilizing resin and a monomer is carried out by adding thereto a polymerization initiator in a nonaqueous solvent.

For example, in the case of a radical polymerization reaction using an azobis compound, a peroxide compound, etc., as is known, since the stability of the initiation radical and the growth radical is low, the elemental reactions (e.g., recombination, chain transfer, stop, hydrogen abstraction, etc.) of a polymer proceed complicatedly, which results in making it difficult to attain efficient bonding of a resin component for a dispersion stability and an insolubilized resin component or forming gelled materials by the progress of a polymerization reaction.

Also, in an ionic polymerization reaction using a ionic polymerization initiator such as an alkyl metal compound, a Lewis acid, a Grignard reagent, etc., since the initiator and a growth living polymer react with an active hydrogen compound such as water, etc., to lose the initiating faculty, there is a problem that a severe purification of a solvent, monomers, etc., is required or the kind of the monomer forming resin particles is restricted.

SUMMARY OF THE INVENTION

The present invention has been made for solving the foregoing problems involved in the conventional nonaqueous resin dispersions.

An object of the present invention is, therefore, to provide a novel process of producing a nonaqueous resin dispersion.

Another object of the present invention is to provide a novel process of producing a nonaqueous resin dispersion excellent in a grafting efficiency of a dispersion stabilizing resin.

Still another object of the present invention is to provide a novel production process of obtaining fine resin particles excellent in the dispersion stability and the redispersion stability and having a narrow particle size distribution.

A further object of the present invention is to provide a liquid developer for electrostatic photography excellent in redispersion characteristics obtained by the foregoing dispersed resin particles.

It has now been discovered that the above objects can be attained by the present invention as set forth hereinbelow.

That is, according to an aspect of the present invention, there is provided a process of producing a nonaqueous resin dispersion, which comprises subjecting to photopolymerization a system containing at least a monomer (A) having one polymerizable double bond, which is soluble in a nonaqueous solvent but becomes insoluble upon polymerization thereof, and at least a dispersion stabilizing resin (P) which is a polymer having a weight average molecular weight of from $1 \times 10^4$ to $1 \times 10^6$ and containing a repeating unit represented by formula (I) in an amount of at least 50% by weight based on the weight of the polymer and has a functional group represented by formula (II) bonded to the side chain of the polymer and/or only one terminal of the main chain of the polymer, said photopolymerization reaction being carried out in the nonaqueous solvent by irradiating the system with ultraviolet rays having a wavelength of not longer than 400 n.m.:

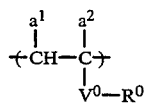

wherein $V^0$ represents —COO—, —OCO—, —$(CH_2)_r$COO—, —$(CH_2)_r$OCO—, —O—, —CONHCOO—, —CONHCONH—, —COND$^{11}$—, SO$_2$ND$^{11}$—, or a phenylene group (wherein D$^{11}$ represents a hydrogen atom or a hydrocarbon group having from 1 to 22 carbon atoms and r represents an integer of from 1 to 4); $a^1$ and $a^2$ which may be the same or different, each represents a hydrogen atom, a halogen atom, a cyano group, a hydrocarbon group, —COO—D$^{12}$, or —COO—D$^{12}$ through a hydrocarbon group (wherein D$^{12}$ represents a hydrocarbon group which may be substituted); and $R^0$ represents an aliphatic group having from 8 to 32 carbon atoms:

wherein $Z^0$ represents —O—R$^1$ or —NR$^2$(R$^3$) (wherein R$^1$ represents a monovalent organic residue the atom of which adjacent to the oxygen atom is a carbon atom and R$^2$ and R$^3$, which may be the same or different, each represents a hydrogen atom or the monovalent organic residue same as R$^1$, with a proviso that R$^2$ and R$^3$ are not simultaneously a hydrogen atom.

According to a preferred embodiment of the process of producing a nonaqueous resin dispersion described above, the dispersion stabilizing resin (P) further contains as a copolymerization component at least one kind of monofunctional macromonomers (M) each having a weight average molecular weight of from $1 \times 10^3$ to $2 \times 10^4$ and having a polymerizable double bond group represented by formula (III) bonded to only one terminal of the main chain of the polymer having at least the repeating unit shown by formula (I) described above:

wherein $b^1$, $b^2$, and $V^1$ have the same meanings as $a^1$, $a^2$, and $V^0$ in formula (I) described above, respectively.

According to another aspect of the present invention, there is provided a liquid developer for electrostatic photography composed of at least resin particles dispersed in a nonaqueous solvent having an electric resistance of at least $1 \times 10^9$ Ω·cm and a dielectric constant of not higher than 3.5, wherein said resin particles are the nonaqueous resin dispersion obtained by the production process described above.

DETAILED DESCRIPTION OF THE INVENTION

The present invention is a novel process of producing a nonaqueous resin dispersion wherein a resin particle dispersion is produced by carrying out a photopolymerization reaction in the coexistence of (i) at least one kind of the dispersion stabilizing resin (P) having the functional group shown by formula (II) described above and containing the repeating unit shown by formula (I) described above, and (ii) the monomer (A) having one polymerizable double bond group, which is soluble in a nonaqueous solvent but is insoluble when polymerized, in the nonaqueous solvent while initiating the photopolymerization by irradiation of ultraviolet rays having a wavelength of not longer than 400 n.m., and also is a liquid developer for electrostatic photography using the resin dispersion.

The production process of the present invention is different from a conventional nonaqueous dispersion polymerization process involving polymerization using a polymerization initiator and has the feature residing in obtaining dispersed resin particles by a living radical polymerization reaction with the irradiation of ultraviolet rays using the resin (P) which is capable of stabilizing the dispersion of nonaqueous dispersed resin particles and initiating polymerization. The reaction proceeds according to a light-inferter process as described in, for example, Takashi Otsu et al., *Makromol. Chem., Rapid. Commun.*, 3, 133(1982), the reaction scheme of which is shown below:

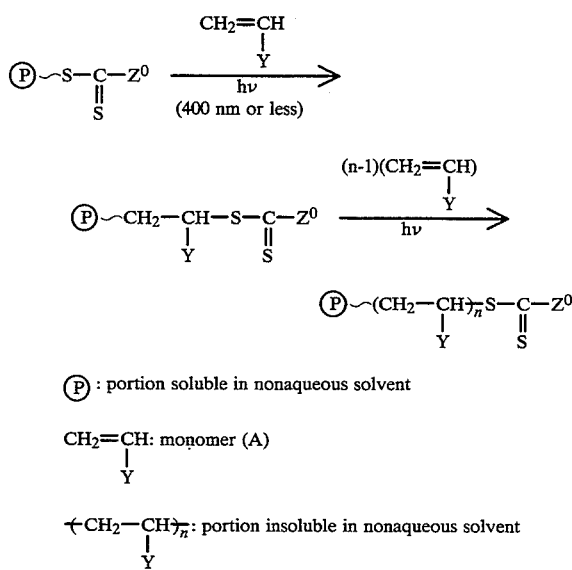

(P) : portion soluble in nonaqueous solvent $CH_2=CH$ : monomer (A)
   |
   Y $\text{+}CH_2—CH\text{+}_n$ : portion insoluble in nonaqueous solvent
       |
       Y As described above, in the reaction of the present invention, the polymerization is initiated at the resin (P) which is the dispersion stabilizing resin, the polymerization growing reaction proceeds livingly i.e., the reaction proceeds with a produced polymer having an active site (radical) at the terminal thereof for a relatingly long time, and the reaction is terminated merely by stopping the irradiation of ultraviolet rays.

Also, the terminal group of the polymer in the reaction of the present invention is chemically utterly inert to other visible rays than ultraviolet rays or in a natural passage of time, and the stability of the polymer being used in this invention is good. Accordingly, the dispersed resin particles in the resin dispersion of the present invention are the polymer of a block copolymer wherein the part of the dispersion stabilizing resin component having an affinity with the nonaqueous solvent is almost quantitatively chemically bonded to the part of the insoluble resin component having a non-affinity with the nonaqueous solvent and show a high dispersion stability which has never been attained in conventional techniques. In particular, it has been found that when the dispersed resin particles are used as a liquid developer for electrostatic photography for reproducing precise images and being used under a severe condition, the liquid developer shows a very good performance.

As the carrier liquid (nonaqueous solvent) having an electric resistance of at least $10^9$ Ω·cm and a dielectric constant of not higher than 3.5, straight chain or branched aliphatic hydrocarbons, alicyclic hydrocarbons, aromatic hydrocarbons, and halogen-substituted products of them are preferably used.

Specific examples thereof are octane, isooctane, decane, isodecane, decalin, nonane, dodecane, isododecane, cyclohexane, cyclooctane, cyclodecane, ligroine, kerosine, benzene, toluene, xylene, mesitylene, Isopar E, Isopar G, Isopar H, Isopar L (Isopar: trade name of Exxon Research and Engineering Company), Shellsol 70, Shellsol 71 (Shellsol: trade name of Shell Oil Co.), Amsco OMS, Amsco 460 solvent (Amsco: trade name of American Mineral Spirits Co.), etc.

These solvents can be used singly or as a mixture thereof.

Also, the foregoing solvent can be used together with other polar organic solvent. Examples of such a polar organic solvent are alcohols (e.g., methanol, ethanol, isopropanol, butanol, and fluorinated alcohols), ethers (e.g., dipropyl ether, tetrahydrofuran, tetrahydropyran, 1,4-dioxane, ethylene glycol dimethyl ether, and propylene glycol dimethyl ether), ketones (e.g., acetone, methyl ethyl ketone, methyl butyl ketone, methyl propyl ketone, diethyl ketone, and cyclohexanone), carboxylic acid esters (e.g., methyl acetate, ethyl acetate, ethyl formate, propyl acetate, butyl acetate, methyl propionate, ethyl propionate, and methyl benzoate), and halogenated hydrocarbons (e.g., methylene dichloride, chloroform, methylchloroform, carbon tetrachloride, and dichloroethane), although the solvent being used in the present invention is not limited thereby.

The polar organic solvent may be added in an amount of 80% by weight or less, preferably 50% by weight or less, more preferably 30% by weight or less, based on the total weight of the carrier liquid, provided that the electric resistance of the resulting carrier liquid should not be less than $10^9$ Ωcm.

In the present invention, a desired organic solvent system can be obtained from the dispersion medium containing the foregoing polar organic solvent being used as a mixture of the nonaqueous solvent, by distilling off the polar organic solvent by heating or under a reduced pressure after the polymerization granulation, or by carrying out a solvent exchange.

In particular, when the dispersed resin particles produced by the process of the present invention are used as the dispersed resin particles of a liquid developer for electrostatic photography of the present invention, even when the foregoing polar organic solvent is contained in the liquid developer as the nonaqueous resin particle dispersion, there is no problem if the resistance of the carrier liquid is in the range of at least $1 \times 10^9$ Ω·cm.

Usually, in the step of producing the resin dispersion, it is preferred to use the solvent same as the carrier liquid for the liquid developer and as such a solvent, there are straight chain or branched aliphatic hydrocarbons, alicyclic hydrocarbons, aromatic hydrocarbon, and halogenated hydrocarbons described above.

As the monomer (A) having one polymerizable double bond group (hereinafter, referred to as the monofunctional monomer (A)) being used in the present invention, any monofunctional monomer which is soluble in the nonaqueous solvent but is insolubilized by being polymerized can be used. Practically, there are, for example, monomers represented by formula (IV)

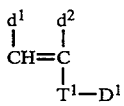

$$\begin{array}{cc} d^1 & d^2 \\ | & | \\ CH=C \\ | \\ T^1-D^1 \end{array} \quad (IV)$$

wherein $T^1$ represents —COO—, —OCO—, —CH$_2$OCO—, —CH$_2$COO—, —O—, —CONHCOO—, —CONHOCO—, —SO$_2$—, —CON(W$^1$)—, —SO$_2$N(W$^1$)—, or a phenylene group (hereinafter, a phenylene group is referred to as —Ph—) (wherein W$^1$ represents a hydrogen atom or an aliphatic group having from 1 to 8 carbon atoms, which may be substituted, e.g., methyl, ethyl, propyl, butyl, 2-chloroethyl, 2-bromoethyl, 2-cyanoethyl, 2-hydroxyethyl, benzyl, chlorobenzyl, methylbenzyl, methoxybenzyl, phenethyl, 3-phenylpropyl, dimethylbenzyl, fluorobenzyl, 2-methoxyethyl, and 3-methoxypropyl); D$^1$ represents a hydrogen atom, an alkyl group having from 1 to 6 carbon atoms, which may be substituted, (e.g., methyl, ethyl, propyl, butyl, 2-chloroethyl, 2,2-dichloroethyl, 2,2,2-trifluoroethyl, 2-bromoethyl, 2-glycidylethyl, 2-hydroxyethyl, 2-hydroxypropyl, 2,3-dihydroxypropyl, 2-hydroxy-3-chloropropyl, 2-cyanoethyl, 3-cyanopropyl, 2-nitroethyl, 2-methoxyethyl, 2-methanesulfonylethyl, 2-ethoxyethyl, N,N-dimethylaminoethyl, N,N-diethylaminoethyl, trimethoxysilylpropyl, 3-bromopropyl, 4-hydroxybutyl, 2-furfurylethyl, 2-thienylethyl, 2-pyridylethyl, 2-morpholinoethyl, 2-carboxyethyl, 3-carboxypropyl, 4-carboxybutyl, 2-phosphoethyl, 3-sulfopropyl, 4-sulfobutyl, 2-carboxyamidoethyl, 3-sulfoamidopropyl, 2-N-methylcarboxyamidoethyl, cyclopentyl, chlorocyclohexyl, and dichlorohexyl) or an aralkyl group having from 6 to 14 carbon atoms, which may be substituted, (e.g., benzyl, phenethyl, 3-phenylpropyl, methylbenzyl, dimethylbenzyl, α-methylbenzyl, methoxybenzyl, 2-naphthylethyl, and chlorobenzyl); d$^1$ and d$^2$, which may be the same or different, each has the same meanings as a$^1$ and a$^2$ in formula (I) described above.

Specific examples of the monofunctional monomer (A) are vinyl esters or allyl esters of an aliphatic carboxylic acid having from 1 to 6 carbon atoms (e.g., acetic acid, propionic acid, butyric acid, monochloroacetic acid, and trifluoropropionic acid); alkyl esters or alkyl amides having from 1 to 4 carbon atoms, which may be substituted, of an unsaturated carboxylic acid such as acrylic acid, methacrylic acid, crotonic acid, itaconic acid, maleic acid, etc., (examples of the alkyl group are methyl, ethyl, propyl, butyl, 2-chloroethyl, 2-bromoethyl, 2-fluoroethyl, trifluoroethyl, 2-hydroxyethyl, 2-cyanoethyl, 2-nitroethyl, 2-methoxyethyl, 2-methanesulfonylethyl, 2-benzenesulfonylethyl, 2-(N,N-dimethylamino)ethyl, 2-(N,N-diethylamino)ethyl, 2-carboxyethyl, 2-phosphoethyl, 4-carboxybutyl, 3-sulfopropyl, 4-sulfobutyl, 3-chloropropyl, 2-hydroxy-3-chloropropyl, 2-furfurylethyl, 2-pyridinylethyl, 2-thienylethyl, trimethoxysilylpropyl, and 2-carboxyamidoethyl]; styrene derivatives (e.g., styrene, vinyltoluene, α-methylstyrene, vinylnaphthalene, chlorostyrene, dichlorostyrene, bromostyrene, vinylbenzenecarboxylic acid, vinylbenzenesulfonic acid, chloromethylstyrene, hydroxymethylstyrene, methoxymethylstyrene, N,N-dimethylaminomethylstyrene, vinylbenzenecarboxyamide, and vinylbenzenesulfonamide); unsaturated carboxylic acids such as acrylic acid, methacrylic acid, crotonic acid, maleic acid, iraconic acid, etc.; cyclic acid anhydrides such as maleic acid, itaconic acid, etc.; acrylonitrile; methacrylonitrile; and heterocyclic compounds having a polymerizable double bond group (practically, the compounds described, e.g., in *Koobunshi (High Molecular) Date Handbook,* pages 175 to 184, edited by Koobunshi Gakkai, published by Baifuu Kan, 1986, such as, for example, N-vinylpyridine, N-vinylimidazole, N-vinylpyrrolidone, vinylthiophene, vinyltetrahydrofuran, vinyloxazoline, vinylthiazole, and N-vinylmorpholine).

The monomers (A) may be used singly or as a mixture of them.

Furthermore, at least one kind of monomers (C) represented by formula (V), having a specific substituent, and copolymerizable with the monofunctional monomer (A) may be used together with the monomer (A) in an amount of from 0.1 to 15 parts by weight, preferably 0.2 to 10 parts by weight, per 100 parts by weight of the monomer (A). By using the monomer (C) together with the monomer (A), the redispersion stability of the dispersed resin particles of the present invention is more improved:

$$\begin{array}{cc} e^1 & e^2 \\ | & | \\ CH=C \\ | \\ T^2-R^{01} \end{array} \quad (V)$$

wherein e$^1$, e$^2$, and T$^2$ have the same meaning as d$^1$, d$^2$, and T$^1$ in formula (IV) described above and R$^{01}$ represents an aliphatic group having 8 or more carbon atoms or a substituent selected from the substituents represented by formula (VI)

$$-A^1-B^1)_{\overline{m}}(A^2-B^2)_{\overline{n}}R^{21} \quad (VI)$$

wherein R$^{21}$ represents a hydrogen atom or an aliphatic group having from 1 to 18 carbon atoms (e.g., a straight-chain or branched alkyl or alkenyl group); B$^1$ and B$^2$, which may be the same or different, each represents —O—, —S—, —CO—, —CO$_2$—, —OCO—, —SO$_2$—, —N(R$^{22}$)—, —CON(R$^{22}$)—, —N(R$^{22}$)CO—, —N(R$^{22}$)SO$_2$—, —SO$_2$N(R$^{22}$)—, —NHCO$_2$—, or —NHCONH— (wherein R$^{22}$ has the same meaning as R$^{21}$ described above); A$^1$ and A$^2$, which may be the same or different, each represents a hydrocarbon group having from 1 to 18 carbon atoms, which may be substituted or may have the moiety represented by formula (a) in the main chain bond:

$$\begin{array}{c} -CH- \\ | \\ B^3-(A^4-B^4)_{\overline{p}}R^{23} \end{array} \quad (a)$$

wherein B$^3$ and B$^4$ which may be the same or different, have the same meanings as B$^1$ and B$^2$ described above; A$^4$ represents a hydrocarbon group having from 1 to 18 carbon atoms (e.g., an alkyl group, an alkenyl group, an aralkyl group, an alicyclic group, an aromatic group, and a hetrocyclic group), which may be substituted; and R$^{23}$ has the same meaning as R$^{21}$ described above; and m, n, and p, which may be the same or different, each represents an integer of from 0 to 4, with a proviso that m, n, and p are not simultaneously 0.

In the monomer (C) shown by formula (V) described above, T$^2$ is preferably —COO—, —CONH—, —CON(W$^1$)— (wherein W$^1$ represents preferably an aliphatic group (e.g., an alkyl group, an alkenyl group, and an aralkyl group) having from 1 to 8 carbon atoms, —OCO—, —CH$_2$OCO— or —O—.

Also, $e^1$ and $e^2$, which may be the same or different, each represents preferably a hydrogen atom, methyl, —COO—D$^{12}$, or —CH$_2$COO—D$^{12}$ (wherein D$^{12}$ represents preferably an alkyl group having from 1 to 32 carbon atoms, an alkenyl group, an aralkyl group, or a cycloalkyl group).

Furthermore, it is more preferred that T$^2$ in formula (V) represents —COO—, —CONH—, or —CON(W$^1$); $e^1$ and $e^2$, which may be the same or different, each represents a hydrogen atom or methyl; and R$^{01}$ has the same meaning as described above.

One of R$^{01}$ in formula (V) represents an aliphatic group having at least 8 carbon atoms, which is practically the same as the aliphatic group shown by R$^0$ in formula (I) described above.

Then, the other of R$^{01}$ in formuler (V), i.e., the substituent shown by formula (VI) described above, is described below in detail.

In formula (VI), A$^1$ and A$^2$ each is more specifically constituted by an optional combination of the atomic groups such as —C(R$^{24}$)(R$^{25}$)— (wherein R$^{24}$ and R$^{25}$ each represents a hydrogen atom, an alkyl group, a halogen atom, etc.), —(CH═CH)—, a cyclohexylene group (hereinafter, the cyclohexylene group is shown by (—C$_6$H$_{10}$—) including 1,2-cyclohexylene, 1,3-cyclohexylene, and 1,4-cyclohexylene), and the group of formula (a) described above.

Also, in the linkage group —T$^2$—(A$^1$—B$^1$—)$_m$—(A$^2$—B$^2$)$_n$—R$^{21}$ in formula (V) described above, it is preferred that the linked main chain constituted from T$^2$ to R$^{21}$ (i.e., T$^2$, A$^1$, B$^1$, A$^2$, B$^2$, and R$^{21}$) is constituted the sum total of the atoms of at least 8. In the case that T$^2$ represents —CON(W$^1$) and W$^1$ represents the substituent shown by formula (VI) described above (i.e., —(A$^1$—B$^1$)$_m$—(A$^2$—B$^2$)$_n$—R$^{21}$) the chain constituted by W$^1$ is included in the linked main chain described above. Furthermore, in the case that A$^1$ and A$^2$ each is a hydrocarbon group having the linkage group shown by formula (a) described above in the linkage of the main chain —B$^3$—(A$^4$—B$^4$)$_p$—R$^{23}$ is also included in the linked main chain described above. As the number of atoms of the linked main chain, when, for example, T$^2$ represents —COO— or —CONH—, the oxo group (═O group) or the hydrogen atom are not included in the number of atoms, and the carbon atom, the ether-type oxygen atom, and the nitrogen atom are included in the number of atoms. Accordingly, the number of atoms of —COO— and —CONH— is 2. Similarly, when R$^{21}$ represents —C$_9$H$_{19}$, the hydrogen atoms are not included in the number of atoms and the carbon atoms are included in the number of atoms. Accordingly, in this case, the number of atoms is 9.

Preferred examples of the monomer (C) shown by formula (V) wherein R$^{01}$ represents the substituent shown by formula (VI) described above, that is, the monomer having the specific polar group, are illustrated below. However, the present invention is not limited to the following compounds with respect to the monomer (C).

In the following formulae, a represents —H or —CH$_3$;

R$_1'$ represents —C$_n$H$_{2n+1}$ (wherein n is an integer of from 1 to 18);

i represents an integer of from 2 to 12;

k represents an integer of from 2 to 5;

R$_2'$ represents —C$_m$H$_{2m+1}$ (wherein m is an integer of from 6 to 18);

R$_3'$ represents —H or —C$_m$H$_{2m+1}$ (wherein m is an integer of from 6 to 18); and r represents an integer of from 1 to 5.

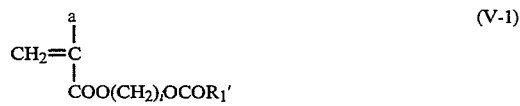

(V-1)

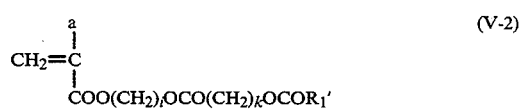

(V-2)

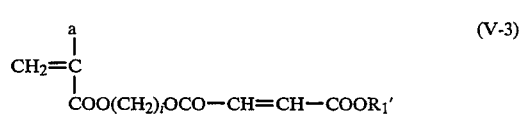

(V-3)

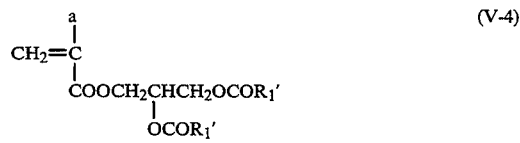

(V-4)

(V-5)

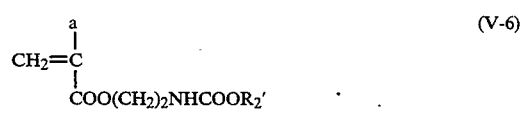

(V-6)

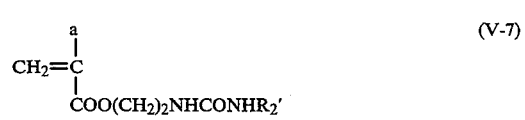

(V-7)

(V-8)

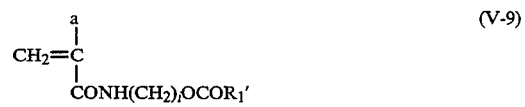

(V-9)

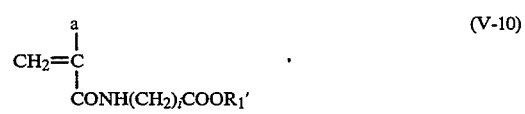

(V-10)

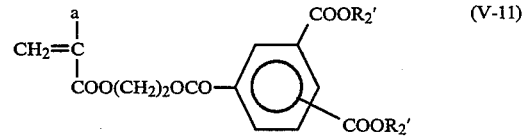

(V-11)

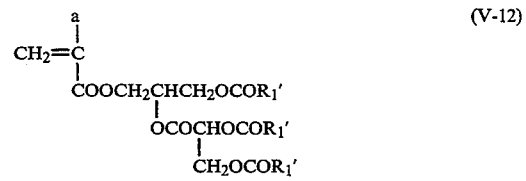

(V-12)

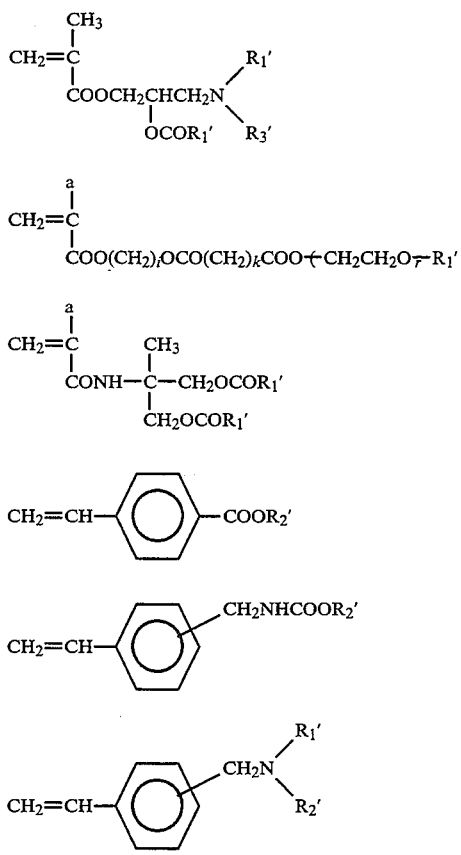

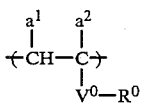

Each of the foregoing monomers (C) having a long-chain aliphatic group or a substituent having the total atom number of at least 9 is copolymerized with the monomer (A) to form insoluble resin particles dispersed in the nonaqueous solvent. It is considered that since the polymer component corresponding to the monomer (C) has the substituent as described above and hence has an affinity for the nonaqueous solvent, the resulting insolubilized resin particles, contain the polymer component more oriented to the surface of the particle or adjacent to the surface than oriented in the inside of the resin particle which is a polar resin particle, so that the affinity of the surface of the resin particles for the nonaqueous solvent is improved to restrain the occurrence of the aggregation of the particles, whereby the dispersion stability is greatly improved.

Then, the dispersion stabilizing resin (P) being used in the present invention is described in detail.

The weight average molecular weight (Mw) of the resin (P) is from $1 \times 10^4$ to $1 \times 10^6$, and preferably from $3 \times 10^4$ to $5 \times 10^5$.

If the molecular weight is less than the foregoing range, the dispersion stability of the resin particles is lowered and if the molecular weight is over the foregoing range, the particle size distribution of the resin particles is increased to reduce the effect of the present invention.

The resin (P) contains the repeating unit shown by formula (I) in an amount of at least 50% by weight based on the weight of the polymer:

wherein $V^0$ represents —COO—, —OCO—, —(CH$_2$)$_r$COO—, —(CH$_2$)$_r$OCO—, —O—, —CONHCOO—, —CONHCONH—, —COND$^{11}$—, —SO$_2$ND$^{11}$— or a phenylene group (—Ph—) (wherein $D^{11}$ represents a hydrogen atom or a hydrocarbon group having from 1 to 22 carbon atoms and r represents an integer of from 1 to 4); $a^1$ and $a^2$, which may be the same or different, each represents a hydrogen atom, a halogen atom, a cyano group, a hydrocarbon group which may be substituted, —COO—D$^{12}$, or —COO—D$^{12}$ through a hydrocarbon group (wherein $D^{12}$ represents a hydrocarbon group which may be substituted); and $R^0$ represents an aliphatic group having from 8 to 32 carbon atoms (e.g., a straight-chain or branched alkyl or alkenyl group).

In formula (I), $D^{11}$ in the substituents shown by $V^0$ represents a hydrogen atom or a hydrocarbon group having from 1 to 22 carbon atoms as described above and preferred examples of the hydrocarbon group are an alkyl group having from 1 to 22 carbon atoms, which may be substituted (e.g., methyl, ethyl, propyl, butyl, heptyl, hexyl, octyl, nonyl, decyl, dodecyl, tridecyl, tetradecyl, hexadecyl, octadecyl, eicosabyl, docosanyl, 2-chloroethyl, 2-bromoethyl, 2-cyanoethyl, 2-methoxycarbonylethyl, 2-methoxyethyl, and 3-bromopropyl), an alkenyl group having from 4 to 18 carbon atoms, which may be substuted (e.g., 2-methyl-1-propenyl, 2-butenyl, 2-pentenyl, 3-methyl-2-pentenyl, 1-pentenyl, 1-hexenyl, 2-hexenyl, 4-methyl-2-hexenyl, decenyl, dodecenyl, tridecenyl, hexadecenyl, octadecenyl, and linolel), an aralkyl group having from 7 to 12 carbon atoms, which may be substituted (e.g., benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl, and dimethoxybenzyl), an alicyclic group having from 5 to 8 carbon atoms, which may be substituted (e.g., cyclohexyl, 2-cyclohexylethyl, and 2-cyclopentylethyl), and an aromatic group having from 6 to 12 carbon atoms, which may be substituted (e.g., phenyl, naphthyl, tollyl, xylyl, propylphenyl, butylphenyl, octylphenyl, dodecylphenyl, methoxyphenyl, ethoxyphenyl, butoxyohenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propioamidophenyl, and dodecyloylamidophenyl).

When $V^0$ represents a phenylene group (—Ph—), the benzene ring may have a substituent such as a halogen atom (e.g., chlorine and bromine), an alkyl group (e.g., methyl, ethyl, propyl, butyl, chloromethyl, and methoxymethyl), etc.

$V^0$ is more preferably —COO—, —OCO—, —COND$^{11}$—, —O—, or a phenylene group.

In formula (I), $a^1$ and $a^2$, which may be the same or different, each preferably represents a hydrogen atom, a halogen atom (e.g., chlorine and bromine), a cyano group, an alkyl group having from 1 to 6 carbon atoms (e.g., methyl, ethyl, propyl, butyl, pentyl, and hexyl), —COO—D$^{12}$, or —CH$_2$COO—D$^{12}$ (wherein D$^{12}$ preferably represents an alkyl group having from 1 to 22 carbon atoms, an alkenyl group, an aralkyl group, an alicyclic group, or an aryl group and these groups may be substituted as described practically in the case of $D^{11}$.

Then, the functional group shown by formula (II) contained in the resin (P) is described in detail.

The functional group of formula (II) shown below is bonded to the copolymer component as a substituent and/or one terminal of the main chain of the polymer of the resin (P):

wherein $Z^0$ represents $-O-R^1$ or $-NR^2(R^3)$ (wherein $R^1$ represents a monovalent organic residue wherein the atom adjacent to the oxygen atom is a carbon atom and $R^2$ and $R^3$, which may be the same or different, each represents a hydrogen atom or the monovalent organic residue same as that shown by $R^1$ with a proviso that both $R^2$ and $R^3$ are not simultaneously a hydrogen atom.

When the functional group is contained as the copolymer component, the content thereof is preferably from 0.5 to 10 parts by weight per 100 parts by weight of the polymer of the resin (p). If the content thereof is over the range, the particle distribution of the dispersed resin particles obtained by the polymerization reaction is broadened.

In a more preferred embodiment, the functional group is bonded to one terminal of the main chain of the resin (P).

As a preferred embodiment of $R^1$ in formula (II), there is a hydrocarbon group having from 1 to 22 carbon atoms, which may be substituted.

Examples of the hydrocarbon group for $R^1$ are an aliphatic group having from 1 to 22 carbon atoms (e.g., an alkyl group such as methyl, ethyl, propyl, butyl, pentyl, hexyl, heptyl, octyl, nonyl, decyl, undecyl, dodecyl, tridecyl, tetradecyl, pentadecyl, hexaecyl, octadecyl, nanodecyl, eicosanyl, docosanyl, etc.; an alkenyl group such as ethenyl, propenyl, butenyl, pentenyl, pentadienyl, hexenyl, hexadienyl, octenyl, decenyl, dodecenyl, tridecenyl, tetradecenyl, hexadecenyl, octadecenyl, eicosenyl, etc.; an alicyclic group such as cyclopentyl, cyclohexyl, cycloheptyl, cyclooctyl, cyclohexcenyl, cyclooctenyl, adamantyl, etc.; and an aralkyl group such as benzyl, phenethyl, 3-phenylpropyl, α-benthylbenzyl, β-methylphenethyl, naphthylmethyl, naphthylethyl, naphthylpropyl, etc.) and an aromatic group (e.g., phenyl and naphthyl).

These hydrocarbon groups may have a substituent such as a halogen atom (e.g., fluorine, chlorine, bromine, and iodine), a hydroxy group, a cyano group, a carboxy group, a sulfo group, an amino group, a formyl group, a phosphono group, a cyclic acid anhydride group, etc., although the present invention is not limited thereto.

Other preferred embodiment of $R^1$ may be a monovalent organic residue bonded to the oxygen atom with a carbon atom and constituted through various linkage groups.

As the linkage group, any bonding group may be used but specific examples of the linkage group are $-C(d^1)(d^2)-$ (wherein, $d^1$ and $d^2$, which may be the same or different, each represents a hydrogen atom, a halogen atom (e.g., chlorine and bromine), a hydroxy group, a cyano group, an alkyl group (e.g., methyl, ethyl, 2-chloroethyl, 2-hydroxyethyl, propyl, butyl, and hexyl), an aralkyl (e.g., benzyl and phenethyl), a phenyl group, etc.], $-CH(d^3)-CH(d^4)-$ (wherein $d^3$ and $d^4$ have the same meaning as $d^1$ and $d^2$]. $-C_6H_{10}-$, $-C_6H_4-$, $-O-$, $-S-$, $-N(d^5)-$ (wherein $D^5$ represents a hydrogen atom or a hydrocarbon group such as, practically, a hydrocarbon group having from 1 to 12 carbon atoms (e.g., methyl, ethyl, propyl, butyl, hexyl, octyl, decyl, dodecyl, 2-methoxyethyl, 2-chloroethyl, 2-cyanoethyl, benzyl, methylbenzyl, phenethyl, phenyl, tollyl, chlorophenyl, methoxyphenyl, and butylphenyl)), $-CO-$, $-COO-$, $-OCO-$, $-NHCOO-$, $-NHCONH-$, $-CON(d^5)-$, $-SO_2N(d^5)-$, $-SO_2-$, $-NHCONH-$, $-NHCOO-$, $-NHSO_2-$, $-CONHCOO-$, $-CONH-CONH-$, a heterocyclic ring (5- or 6-membered ring having at least one kind of a hetero atom such as O, S, N, etc., or the condensed ring of them; examples thereof are thiophene, pyridine, furan, imidazole, piperidine, and morpholine), and $-Si(d^6)(d^7)-$ ($d^6$ and $d^7$, which may be the same or different, each represents a hydrocarbon group or $-OD^8$ (wherein $d^8$ represents a hydrocarbon group) and these hydrocarbons are same as those described as $d^5$ above). These linkage groups may be used singly or may be preferably used as an organic residue constituted by a combination of these linkage groups.

There is no particular restriction on the monovalent organic residue but it is preferred that the total atom number of the substituents constituting the organic residue does not exceed 22.

When $Z^0$ in formula (II) is $-NR^2(R^3)$, the substituents shown by $R^2$ and $R^3$ are the same as those defined for $R^1$.

In the present invention, what is important in formula (II) is the partial structure shown by the following formula

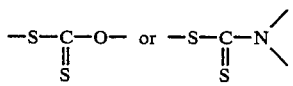

and $R^1$, $R^2$, and $R^3$ are not limited to those exemplified above. In the case that the functional group shown by formula (II) is contained in the chain of a copolymerization component, any vinylic compounds containing the functional group copolymerizable with a monomer corresponding to, for example, the repeating unit shown by formula (II) can be used as a copolymerization component, and they can be represented by formula (VII)

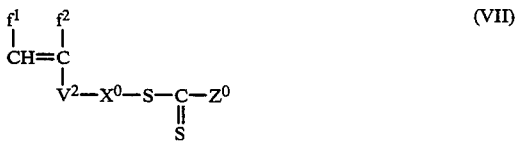

wherein $f^1$, $f^2$, and $V^2$ have the same meaning as $a^1$, $a^2$, and $V^0$ in formula (I) described above; $-S-C(=S)-Z^0$ represents the same functional group as in formula (II); and $X^0$ represents a divalent organic residue bonding $-V^2-$ and $-S-C(=S)-Z^0$, such as those defined for $R^1$ in formula (II) or a combination, and preferably those having the total atom number constituting the portion $-(V^2-X^0)-$ of from 6 to 20.

The functional group shown by formula (II) is preferably bonded to one terminal of the main chain of the polymer chain of the resin (P).

In the preferred embodiment, the functional group is bonded to the terminal of the main chain directly or through a linkage group. The linkage group is exemplified with those defined for $R^1$ in formula. (II) or a combination thereof.

A preferred dispersion stabilizing resin (P) is a comb-type block copolymer of a mono-functional macromonomer (M) with a comonomer.

The macromonomer (M) is an addition polymerizable macromonomer having a weight average molecular weight of from $1 \times 10^3$ to $2 \times 10^4$ (preferably from $2 \times 10^3$ to $1.5 \times 10^4$) and copolymerizable with the monomer corresponding to the repeating unit shown by formula (I) described above, and the macromononer being obtained by bonding the polymerizable double bond group shown by formula (III) to one terminal only of the main chain of a polymer containing the repeating unit shown by formula (I) described above:

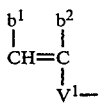
(III)

wherein $b^1$, $b^2$, and $V^1$ have the same meanings as $a^1$, $a^2$, and $V^0$ in formula (I) described above, respectively.

In the macromonomer (M), the content of the repeating unit shown in formula (I) is preferably from 50 to 100% by weight, more preferably from 70 to 100% by weight, based on the weight of the macromonomer.

As a comonomer to copolymerize with the macromonomer, any monomer corresponding to the repeating unit shown by formula (I) may be used and practically there are the same monomers as the compounds illustrated for the monofunctional monomer (A) described above.

The content of the monofunctional macromonomer (M) in the resin (P) is from 1 to 60% by weight, preferably from 5 to 40% by weight, based on the weight of the polymer of the resin (P).

If the content of the monofunctional macromonomer (M) is less than 1% by weight, the effect of introducing the graft structure in the resin (P) is lessen, so that the effect of improving the dispersion stability of the resin particles is reduced. Also, if the content thereof is more than 60% by weight, the copolymerizability with the comonomer is undesirably lowered.

The polymerizable double bond group shown by formula (III) is bonded to one terminal of the main chain of the macromonomer containing the repeating unit shown by formula (I) directly or through a linkage group which is exemplified with those defined for $R^1$ of formula (II) or a combination thereof.

Specific examples of the polymerizable double bond group shown by formula (III) are illustrated below but the invention is not limited thereto. (In addition, in the case of bonding the polymerizable double bond group of formula (III) to the polymer main chain of the macromonomer (M) through a linkage group, the double bond group is shown together with the linkage group.)

In the following formulae showing the polymerizable double bond groups;

b represents —H or —CH$^3$;

X represents —S— or a direct bond;

$m_1$ represents an integer of from 1 to 12; and $n_1$ represents an integer of from 2 to 12.

(III-1)

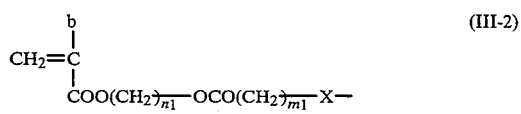
(III-2)

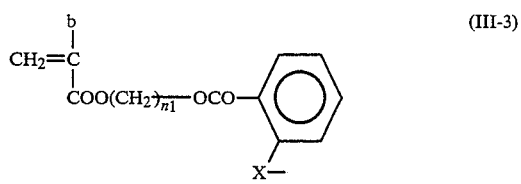
(III-3)

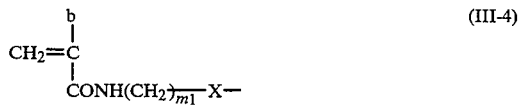
(III-4)

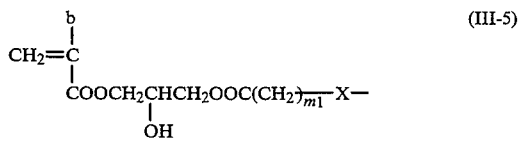
(III-5)

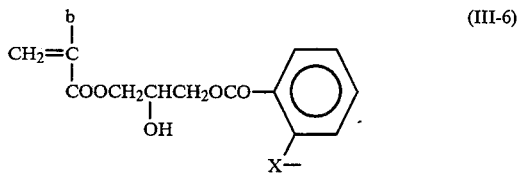
(III-6)

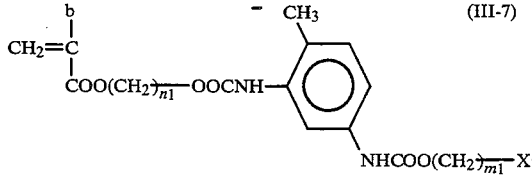
(III-7)

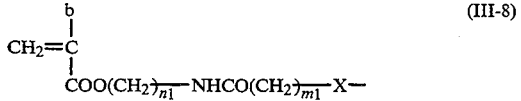
(III-8)

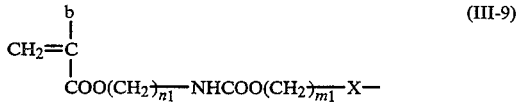
(III-9)

(III-10)

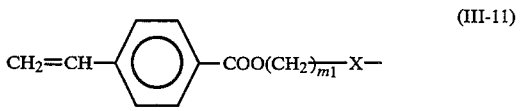
(III-11)

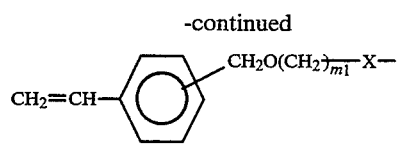 (III-12)

 (III-13)

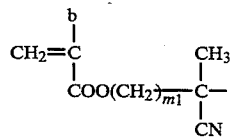 (III-14)

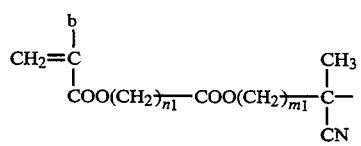 (III-15)

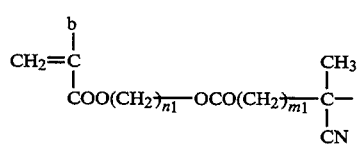 (III-16)

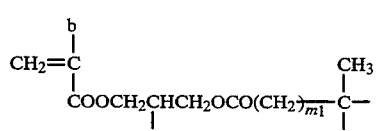 (III-17)

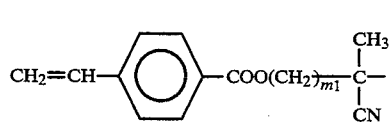 (III-18)

 (III-19)

 (III-20)

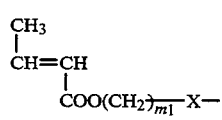 (III-21)

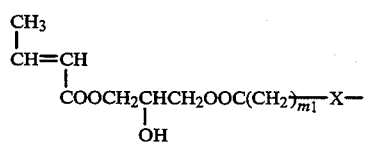 (III-22)

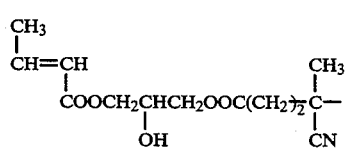 (III-23)

 (III-24)

 (III-25)

 (III-26)

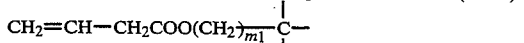 (III-27)

 (III-28)

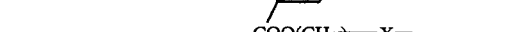 (III-29)

 (III-30)

  (III-31)

The macromonomer (M) being used in the present invention can be produced by a conventionally known synthesis method.

For example, there are (1) a method by an ionic polymerization method of reacting various reagents to the terminal of a living polymer obtained by an anionic polymerization or a cationic polymerization to form a macromer; (2) a method by a radical polymerization method of reacting various reagents and an oligomer having a reactive group bonded to the terminal thereof obtained by a radical polymerization, using a polymerization initiator and/or a chain-transfer agent each containing a reactive group such as a carboxy group, a hydroxy group, an amino group, etc., in the molecule to form a macromer; (3) a method by a polyadditional condensation method of introducing a polymerizable double bond to an oligomer obtained by a polyadditional or polycondensation reaction as in the foregoing radical polymerization method, etc.

Specifically, the monofunctional macromer (M) can be synthsized by the methods described in P. Drefuss &

R. P. Quirk, *Polym. Sci. Eng.*, 7, 551 (1987); P. F. Rempp & E Franta, *Adv. Polym. Sci.*, 58, 1 (1984); V. Percec, *Appl. Polym. Sci.*, 285, 95 (1984), R. Asami & M. Takari, *Makvamol. Chem. Suppl.*, 12, 163 (1985); P. Rempp et al, *Makavamol. Chem. Suppl.*, 8, 3 (1984), Yusuke Kawakami, *Kagaku Kogyo (Chemical Industry)*, 38, 56 (1987); Yuuya Yamashita, *Koobunshi (High Molecule)*, 31, 988 (1982); Shiro Kobayashi, *Koobunshi (High Molecule)*, 50, 625 (1981); Toshinobu Higashinura, *Nippon Setchaku Kyokai Shi (Journal of Adhesive Sci. of Japan*, 18, 536 (1982); Kooichi Ito, *Koobunshi Kako (High Molecular Working)*, 35, 262 (1986), Koshiro Higashi & Takashi Tuda, *Kinoo Zairyou (Functional Material)*, 1987, No. 10, 5, etc., and the literatures and the patents cited therein.

Examples of the foregoing polymerization initiator having a reactive group in the molecule are azobis series compounds such as 4,4'-azobis(4-canovaleric acid), 4,4'-azobis(4-cyanovaleric acid chloride), 2,2'-azobis(2-cyanopropanol), 2,2'-azobis(2-cyanopentanol), 2,2'-azobis(2-(5-hydroxy-3,4,5,6-tetrahydropurimidine-2-yl)propane), 2,2'-azobis(2-methyl-N-(1,1-bis(hydroxymethyl)-2-hydroxyethyl)propioamide), 2,2,-azobis(2-methyl-N-(1,1-bis(hydroxymethyl)ethyl)propioamide), 2,2'-azobis(2-methyl-N-(2-hydroxyethyl)propioamide), 2,2'-azobis(2-amidinopropane), 2,2'-azobis(2-methyl-N-(2-hydroxyethyl)-propioamide), 2,2'-azobis(2-(5-methyl-2-imidazoline-2-yl)propane), 2,2'-azobis(2-(4,5,6,7-tetrahydro-1H-1,3-diazepin-2-yl)propane), 2,2'-azobis(2-(3,4,5,6-tetrahydropyrimidine-2-yl)propane), 2,2'-azobis(2-(1-(2-hydroxyethyl)-2-imidazoline-2-yl)propane), 2,2'-azobis(N-(2-hydroxyethyl)-2-methylpropionamide), 2,2'-azobis(N-(4-aminophenyl)-2-methylpropionamidine), etc.

As the chain-transfer agent containing a reactive group in the molecule, there are a mercapto compound containing the reactive group or a substituent capable being induced to the reactive group (e.g., thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-(N-(2-mercaptoethyl)carbamoyl)propionic acid, 3-(N-(2-mercaptoethyl)amino)-propionic acid, N-(3-mercaptopropionyl)alanine, 2-mercaptoethanesulfonic acid, 3-mercaptopropanesulfonic acid, 4-mercaptobutanesulfonic acid, 2-mercaptoethanol, 3-mercapto-1,2-propanediol, 1-mercapto-2-propanol, 3-mercapto-2-butanol, mercaptophenol, 2-mercaptoethylamine, 2-mercaptoimidazole, and 2-mercapto-3-pyridinol) and an iodized alkyl compound containing the reactive group or a substituent capable of being induced to the reactive group (e.g., iodoacetic acid, iodopropionic acid, 2-iodoethanol, 2-iodoethanesulfonic acid, and 3-iodopropanesulfonic acid). In these compounds, the mercapto compounds are preferably used.

The amount of the chain-transfer agent or the polymerization initiator is from 0.1 to 10 parts by weight, preferably from 0.5 to 5 parts by weight, per 100 parts by weight of the total monomers.

The dispersion stabilizing resin (P) being used in the present invention can be synthesized by a conventionally known method.

That is, in the case that the functional group shown by formula (II) is contained only in the polymer side chain of the resin (P), the polymer can be synthesized by (1) a method of polymerizing the monomer shown by formula (VII) described above together with an other monomer; and (2) a method of polymerizing a monomer containing a group capable of introducing the functional group shown by formula (II) together with an other monomer and then introducing the functional group shown by formula (II) by a high molecular reaction, etc.

Also, in the case that the functional group shown by formula (II) is contained in one terminal of the polymer main chain of the resin (P), which is the preferred embodiment of the present invention, there are (1) a method of polymerizing a mixture of a monomer corresponding to the repeating unit shown by formula (I), the foregoing macromonomer (M), and the chain-transfer agent containing the functional group shown by formula (II) with a polymerization initiator (e.g., an azobis compound and a peroxide); (2) a method of polymerizing a mixture of the monomer corresponding to the repeating unit shown by formula (I) and the macromonomer (M) using a polymerization initiator containing the functional group; (3) a method of using a chain-transfer agent containing the functional group and a polymerization initiator containing the functional group in the foregoing polymerization; and (4) a method of carrying out the polymerization reaction using a compound containing an amino group, a halogen atom, an epoxy group, an acid halide group, etc., as a substituent for the chain-transfer agent or the polymerization initiator in each of the foregoing three methods, and thereafter introducing the functional group into the polymer by a high molecular reaction, etc.

Practically, the dispersion stabilizing resin (P) can be produced by the methods described in P. Dreyfuss & R. P. Quirk, *Encycl. Polym. Sci. Eng.*, 7, 551 (1987); Yoshiki Nakajo & Yuuya Yamashita, *Senryo to Yakuhin (Dyes and Chemicals)*, 30, 232 (1985); Akira Ueda & Susumu Nagai, *Kagaku to Kogyo (Science and Industry)*, 60, 57 (1986), etc. and the literatures, etc., cited therein.

As specific examples of the foregoing chain-transfer agent containing the specific functional group or a substituent capable of being induced to the functional group, the mercapto compounds and ionized alkyl compounds described above as the chain-transfer agents containing a reactive group used in the synthesis method of the macromonomer (M) can be used. In these compounds, the mercapto compounds are preferred.

Also, as the foregoing polymerization initiator containing the specific functional group or a substituent capable of being induced into the functional group, azobis compounds described above as the polymerization initiator containing the reactive group used in the macromonomer (M) can also be used.

The using amount of the chain-transfer agent or the polymerization initiator is from 0.1 to 10 parts by weight, preferably from 0.5 to 10 parts by weight, per 100 parts by weight of the sum of the total monomers and the total macromonomers (M).

Furthermore, the dispersion stabilizing resin (P) can be also easily synthesized by (1) a method of reacting a reagent containing the functional group shown by formula (II) at the terminal of a living polymer obtained by a conventionally known anionic polymerization or cationic polymerization, or (2) a method (a method by an ionic polymerization method) of reacting a reagent containing a specific reactive group (e.g., —OH, —COOH, —SO$_3$H, —SH, —NH$_2$, —PO$_3$H$_2$, —NCO, —NCS, an epoxy group, —COCl, and —SO$_2$Cl) with the terminal of the foregoing living polymer, followed by a high molecular reaction to introduce the functional group.

Practically, the dispersion stabilizing resin (P) can be synthesized according to the methods similar to the methods described in the literatures, the patents, etc., illustrated for the synthesis methods of the macromonomer (M) described above.

As a more preferred embodiment of the synthetic method, the functional group can be easily introduced into one terminal of the polymer main chain by carrying out a photopolymerization reaction using an organic compound containing the functional group shown by formula (II) as the polymerization initiator. Practically, the dispersion stabilizing resin (P) can be synthesized by the methods described in Takayuki Ootu, *Kobunshi (High Molecule)*, 37, 248 (1988); Shunichi Hinokimori & Ryuuichi Ootu, *Polym. Rep. Jap.*, 37, 3508 (1988); JP-A-64-111, JP-A-64-26619, etc.

The dispersion stabilizing resin (P) is soluble or semi-soluble in the nonaqueous solvent which is used for the polymerization granulation reaction. The semi-soluble resin means that when the resin (P) is mixed with the nonaqueous solvent at a temperature of 25° C., the state of the mixture is in a dispersion of a microgel-form resin having a mean particle size of not larger than 0.1 $\mu$m. The resin (P) is preferably soluble in an organic solvent and it is sufficient for the resin (P) to dissolve in an amount of 5 parts by weight or more in 100 parts by weight of toluene at 25° C.

The production process of the nonaqueous resin dispersion of the present invention is as follows.

In general, the dispersion stabilizing resin (P) as described above and the monofunctional monomer (A) may be polymerized by heating in a nonaqueous solvent under the irradiation of light (ultraviolet rays) having wavelengths of not longer than 400 n.m. in a degassed atmosphere.

Practically, there are (1) a method of irradiating a mixture of the dispersion stabilizing resin (P), the monomer (A), and the nonaqueous solvent with ultraviolet rays; (2) a method of adding dropwise the monomer (A) into a mixture of the dispersion stabilizing resin (P) and the nonaqueous solvent under the irradiation of ultraviolet rays; (3) a method of adding a part of the monomer (A) to a nonaqueous solvent containing the whole amount of the dispersion stabilizing resin (P) and the residual amount of the monomer (A) under the irradiation of ultraviolet rays; and (4) a method of adding a mixture of the dispersion stabilizing resin (P) and the monomer (A) to the nonaqueous solvent under the irradiation of ultraviolet rays, etc.

As the light source for the ultraviolet rays being used in the present invention, an ordinary light source can be used and practically, there are a mercury lamp (high pressure or low pressure), a xenon lamp, a deep UV lamp, a metal halide lamp, etc., and the light of the light source is used by cutting wavelengths of longer than 400 n.m. with a filter.

The total amount of the dispersion stabilizing resin (P) and the monomer (A) is from about 5 to 80 parts by weight, preferably from 10 to 60 parts by weight, per 100 parts by weight of the nonaqueous solvent. The amount of the dispersion stabilizing resin (P) is from 1 to 50 parts by weight, preferably from 3 to 30 parts by weight, per 100 parts by weight of the total monomers (A).

The polymerization temperature is from about 30° to 180° C., and preferably from 40° to 100° C. The reaction time is preferably from 1 to 15 hours.

When a polar solvent such as alcohols, ketones, ethers, esters, etc., is used together with the nonaqueous solvent used for the reaction or when unreacted materials of the monomers (A) remain, it is preferred to remove them by distilling off by heating to a temperature of higher than the boiling point of the solvent or the monomer (A), or distilling off under a reduced pressure.

Furthermore, the nonaqueous solvent used at the polymerization granulation may be changed with a desired nonaqueous solvent. In this case, as a matter of course, it is preferred that the boiling point of the nonaqueous solvent being used for the exchange is higher than the boiling point used for the reaction.

The resin particles of the nonaqueous resin dispersion thus produced are fine particles having a uniform particle size distribution and, at the same time, show a very stable dispersibility. Also, when the resin particles are fixed by heating, etc., a strong coated layer is formed and thus show an excellent fixing property.

The nonaqueous resin dispersion thus obtained is suitable as dispersed resin particles of a liquid developer for electrostatic photography.

The liquid developer of the present invention comprises a nonaqueous solvent having an electric resistance of at least $1\times10^9$ $\Omega$cm and a dielectric constant of not higher than 3.5 containing the dispersed resin particles described above.

As the nonaqueous solvent, straight chain or branched aliphatic hydrocarbon, alicyclic hydrocarbons, aromatic hydrocarbons, and the halogen substituted products of them can be preferably used. Examples thereof are octane, isooctane, decane, isodecane, decaline, nonane, dodecane, isododecane, cyclohexane, cyclooctane, cyclodecane, benzene, toluene, xylene, mesitylene, Isopar E, Isopar G, Isopar H, Isopar L (Isopar: trade name of Exxon Research and Engineering Company), Shellsol 70, Shellsol 71 (Shellsol: trade name of Shell Oil Co.), Amsco OMS, Amsco 460 solvent (Amsco: trade name of American Mineral Spirits Co.), etc. They can be used singly or as a mixture thereof.

As the solvent which can be used together with the foregoing nonaqueous solvent, there are alcohols (e.g., methanol, ethanol, propanol, butanol, and fluorinated alcohols), ketones (e.g., acetone, methyl ethyl ketone, and cyclohexanone), carboxylic acid esters (e.g., methyl acetate, ethyl acetate, propyl acetate, butyl acetate, methyl propionate, and ethyl propionate), ethers (e.g., diethyl ether, dipropyl ether, tetrahydrofuran, and dioxane), halogenated hydrocarbons (e.g., methylene dichloride, chloroform, carbon tetrachloride, dichloroethane, and methylchloroform).

It is preferred that the foregoing solvent used together with the nonaqueous solvent being used in the present invention is distilled off by heating or under a reduced pressure after the polymerization granulation but even when the solvent is carried in the liquid developer as the latex particle dispersion, there is no problem if the electric resistance of the liquid of the liquid developer meets the condition of at least $1\times10^9$ $\Omega$cm.

Usually, it is preferred to use the same nonaqueous solvent as the carrier liquid used in the step of producing the resin dispersion and as described above, straight chain or branched aliphatic hydrocarbons, alicyclic hydrocarbons, aromatic hydrocarbons, halogenated hydrocarbons, etc., are used.

The liquid developer of the present invention preferably contains a charge controlling agent for precisely controlling the electroscopic property of the resin particles dispersed in the organic solvent.

As the charge controlling agent for the liquid developer of the present invention, conventionally known agents can be used. For example, the metal salts of a fatty acid such as naphthenic acid, octenic acid, oleic acid, stearic acid, etc.; the metal salts of sulfosuccinic acid esters; the oil-soluble metal sulfonates described in JP-B-45-556 (the term "JP-B" as used herein means an "examined published Japanese patent application"), JP-A-52-37435, JP-A-52-37049, etc.; the metal salts of phosphoric acid ester described in JP-B-45-9594; the metal salts of abietic acid or hydrogenated abietic acid described in JP-B-48-25666; the calcium alkylbenzenesulfonates described in JP-B-55-2620; the metal salts of aromatic carboxylic acid or sulfonic acid described in JP-A-52-107837, JP-A-52-38937, JP-A-57-90643, and JP-A-57-139753; nonionic surface active agents such as polyoxyethylated alkylamine, etc.; fats and oils such as lecithin, linseed oil, etc.; polyvinylpyrrolidone; organic acid esters of polyhydric alcohols; phosphoric acid ester type surface active agents described in JP-A-57-210345; and the sulfonic acid resin described in JP-B-56-24944 can be used. Also, the amino acid derivatives described in JP-A-60-21056 and JP-A-61-50951 can be used.

Furthermore, the reaction products of a maleic anhydride copolymer or itaconic anhydride copolymer and a primary or secondary amine described in JP-A-59-30917, JP-A-59-29938, and JP-A-59-38264; the copolymer containing maleic acid half acylamide and N-substituted maleinimide described in JP-A-59-36787; and further the quaternarized amine polymers described in JP-A-54-31739, JP-B-56-24944, etc., can be also used.

For the liquid developer of the present invention, if desired, a coloring agent may be used. There is no particular restriction on the coloring agent and various pigments and dyes conventionally known can be used. For example, there are metal powders such as an aluminum powder, etc.; metal oxides such as magnetic iron oxide, zinc oxide, titanium oxide, silicon dioxide, etc.; metal salts such as powdered lead cadmium-seleniumchromate, etc.; Hansa Yellow (C.I. 11680), Benzidine Yellow G (C.I. 21090), Benzidine Orange (C.I. 21110), Fast Red (C.I. 37085) Brilliant Carmine 3B (C.I. 16015-Lake), Phthalocyanine Blue (C.I. 74160), Phthalocyanine Green (C.I. 74260), Victoria Blue (C.I. 42595-Lake), Spirit Black (C.I. 50415), Oil Blue (C.I. 74350), Alkali Blue (C.I. 42770A), Fast Scarlet (C.I. 12315), Rhodamine 6B (C.I. 45160), Fast Sky Blue (C.I. 74200-Lake), Nigrosine (C.I. 50415), carbon black, etc. Also, surface-treated pigments such as, for example, carbon black dyed with Nigrosine and graft carbon graftpolymerized with a polymer can be used.

In the case of coloring the dispersed resin itself, as one of the coloring methods, there is a method of physically dispersing a pigment or a dye in the dispersed resin and a method of dyeing the dispersed resin with a preferred dye as described in JP-A-57-48738.

A method of chemically bonding the dispersed resin with a dye as disclosed in JP-A-53-54029 and a method of using a monomer previously containing a dye in the case of producing the dispersed resin by a polymerization granulation method to form a copolymer containing the dye as described in JP-B-44-22955 can also be employed.

The liquid developer of the present invention may contain, if desired, various additives for improving the charging characteristics and the imaging characteristics, and examples thereof are described, e.g., in Yuuji Harasaki, *Denshi Shashin (Electrophotography)*, Vol. 16, No. 2, page 44 are used, such as higher alcohols, fluorized alcohols, polyethers, olefin waxes, silicone oils, and hetrocyclic compounds. But the additives are not limited thereto.

The amount of each main component of the liquid developer of the present invention is as follows.

The amount of the toner particles composed of the resin (and a coloring agent being used if desired) as the main component(s) are preferably from 0.5 to 50 parts by weight per 1,000 parts by weight of the carrier liquid. If the amount thereof is less than 0.5 parts by weight, the image density obtained is insufficient, while of the amount is over 50 parts by weight, a fog is liable to form on non-imaged portions.

Furthermore, the foregoing dispersion stabilizing carrier liquid-soluble resin is, if necessary, used and the amount is from about 0.5 to 100 parts by weight to 1,000 parts by weight of the carrier liquid.

The amount of the foregoing charge controlling agent is preferably from 0.001 to 1.0 part by weight to 1,000 parts by weight of the carrier liquid.

Furthermore, if desired, various additives may be added to the liquid developer and the upper limit of the total amounts of these additives are restricted by the electric resistance of the liquid developer. That is, if the electric resistance of the liquid developer in a state of removing the toner particles is lower than $1 \times 10^9$ $\Omega$cm, a continuous gradation image having a good quality is reluctant to obtain and hence it is necessary to control the addition amount of each additive within the limit.

As a photoconductive material to which the liquid developer of the present invention is applied, there are well-known organic photoconductive materials and inorganic photoconductive materials. Also, dielectrics charged by a charging conductor can be used.

As the organic photoconductive materials, there are well-known various organic photoconductive materials as described in Research Disclosure, No. 10938 (May, 1973), page 61 st seq., "Electrophotographic Elements, Materials, and Process"

Specific examples which are practically used are the electrophotographic photoreceptor composed of poly-N-vinylcarbazole and 2,4,7-trinitrofluoren-9-one as described in U.S. Pat. No. 3,484,237; the photosensitive material composed of poly-N-vinylcarbazole sensitized with a pyrylium salt series dye as described in JP-B-48-25658; the electrophotographic photoreceptor composed of an organic pigment as the main component described in JP-A-49-37543; the electrophotographic photoreceptor containing an eutetic complex composed of a dye and a resin as the main component described in JP-A-47-10735; and the electrophotographic photoreceptor composed of copper phthalcyanine dispersed in a resin described in JP-B-52-1667. Other electrophotographic photoreceptors are described in *Denshishashin Gakkai Shi (Journal of Electrophotographic Society)*, Vol. 25, No. 3, 62-76(1986).

As the inorganic photoconductive material being used in the present invention, there are typically various kinds of inorganic compounds disclosed in R. M. Schaffert, *Electro Photography,* 260–374(1975), published by Focal press (London). Specific examples thereof are zinc oxide, titanium oxide, zinc sulfide, cadmium sulfide, a selenium-tellurium alloy, a selenium-arsenic alloy, and selenium-telluriumarsenic alloy.

Then, the effect of the present is described in more detail with reference to the Production Examples of the monofunctional macromonomer (M), the dispersion stabilizing resin (P), and the dispersed resin particles of the present invention and the Examples of the present invention, but the present invention is not limited thereto.

Production Example of Monofunctional Macromonomer (M): (M-1)

A mixed solution of 100 g of octadecyl methacrylate, 3 g of mercpatopropionic acid, and 200 g of toluene was heated to 75° C. with stirring under a nitrogen gas stream. Then, after adding thereto 1.0 g of 2,2'-azobisisobutyronitrile (A.I.B.N.), the reaction was carried out for 4 hours, further after adding thereto 0.5 g of A.I.B.N., the reaction was carried out for 3 hours, and further after adding thereto 0.3 g of A.I.B.N., the reaction was carried out for 3 hours. Then, to the reaction mixture were added 8 g of glycidyl methacrylate, 1.0 g of N,N-dimethyldodecylamine, and 0.5 g of t-butylhydroquinone and the resultant mixture was stirred for 12 hours at 100° C. After cooling, the reaction mixture was reprecipitated in 2 liters of methanol to provide 82 g of a white powder of the polymer (M-1) shown below. The weight average molecular weight (Mw) of the polymer was 6,500.

M-1:

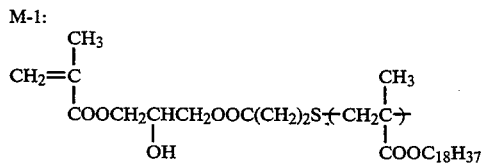

Production Example 2 of Monofunctional Macromonomer (M): (M-2)

A mixed solution of 100 g of dodecyl methacrylate, 3 g of thioethanol, and 200 g of toluene was heated to 70° C. with stirring under a nitrogen gas stream. Then, after adding to the mixture 1.0 g of A.I.B.N, the reaction was carried out for 4 hours, furthermore, after adding thereto 0.5 g of A.I.B.N., the reaction was carried out for 3 hours, and thereafter, after further adding thereto 0.3 g of A.I.B.N., the reaction was carried out for 3 hours. Then, after cooling the reaction mixture to room temperature, 10.9 g of 2-carboxyethyl methacrylate was added to the reaction mixture and then a mixed solution of 14.4 g of dichlorohexylcarbodiimide (D.C.C.), 1 g of 4-(N,N-dimethylamino)pyridine, and 150 g of methylene chloride was added dropwise thereto over a period of one hour. Then, 1.0 g of t-butylhydroquinone was added to the mixture and the resulting mixture was stirred for 4 hours as it was.

To the mixture was added 10 g of an aqueous solution of 85% formic acid and the resulting mixture was stirred for 2 hours as it was. Crystals thus precipitated were recovered by filtration and reprecipitated in 2 liter of methanol. The oily product thus precipitated was collected by decantation, dissolved in 200 ml of tetrahydrofuran, and the solution was reprecipitated again in one liter of methanol. The oily product was collected and dried under a reduced pressure to provide 60 g of the polymer (M-2) shown below having a weight average molecular weight of 6,800.

M-2:

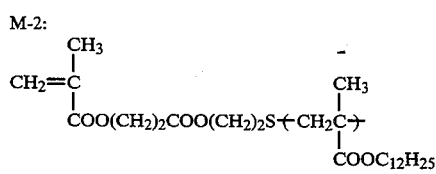

Production Example 3 of Monofunctional Macromonomer (M): (M-3)

A mixed solution of 60 g of octadecyl methacrylate, 40 g of dodecyl acrylate, 150 g of tetrahydrofuran, and 50 g of isopropyl alcohol was heated to 75° C. with stirring under a nitrogen gas stream. Then, after adding to the reaction mixture 6.0 g of 4,4'-azobis(4-cyanovaleric acid) (A.C.V.), the reaction was carried out for 5 hours and after further adding thereto 1.0 g of A.C.V., the reaction was carried out for 4 hours. After cooling, the reaction mixture was reprecipitated in 1.5 liters of methanol and the oily product thus precipitated was collected by decantation and dried under a reduced pressure. The amount of the oily product thus obtained was 85 g.

To 50 g of the oily product (oligomer) thus obtained were added 15 g of glycidyl methacrylate, 1.0 g of N,N-dimethyldodecylamine, and 1.0 g of 2,2'-methylenebis(6-t-butyl-p-cresol) and the resulting mixture was stirred for 15 hours at 100° C. After cooling, the reaction mixture was reprecipitated in one liter of petroleum ether to provide 42 g of a white powder of the polymer (M-3) shown below. The weight average molecular weight of the polymer was $1.0 \times 10^4$.

M-3:

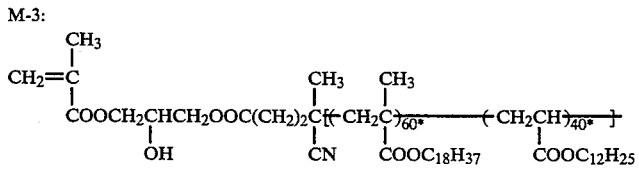

*weight ratio

Production Example 3 of Monofunctional Macromonomer (M): (M-4)

A mixed solution of 100 g hexadecyl methacrylate, 4 g of 2-mercaptoethylamine, and 200 g of tetrahydrofuran was heated to 70° C. with stirring under a nitrogen gas stream. Then, after adding to the mixture 1.0 g of A.I.B.N., the reaction was carried out for 4 hours and after further adding thereto 0.5 g of A.I.B.N., the reaction was carried out for hours. Then, after adjusting the temperature of the reaction mixture to 30° C., 10 g of 2-(methacrolyloxyethyl) isocyanate, 0.1 g of tetra(- butoxy) thitanate, and 0.5 of t-butylhydroquinone were added to the reaction mixture and the resulting mixture was stirred for 8 hours. After cooling, the operation of reprecipitating the reaction mixture in 2 liters of methanol was repeated twice to provide 63 g of a light yellow viscous product of the polymer (M-4) shown below. The weight average molecular weight of the polymer was 6,600.

Production Examples 5 to 15 of Monofunctional macromonomers (M): (M-5) to (M-15)

By the method of using each mercapto compound containing a reactive group as the chain-transfer agent as in the method of Production Example 2 of the monofunctional macromonomer (M), each of the macromonomers (M) described in Table A shown below was produced. Mws of the macromonomers (M) obtained were in the range of from $6 \times 10^3$ to $1 \times 10^4$.

M-4:
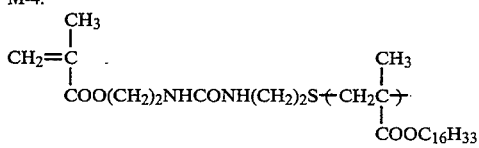

TABLE A

Production Example of Mono-Functional Macromonomer (M)

| Production Example | Macromonomer (M) | Chemical Structure of Macromonomer (M) |
|---|---|---|
| 5 | M-5 | CH$_2$=CH–COO(CH$_2$)$_2$COO(CH$_2$)$_2$S–[–(CH$_2$C(CH$_3$)(COOC$_{16}$H$_{33}$))$_{70}$–(CH$_2$CH(COOC$_{13}$H$_{27}$))$_{30}$–] |
| 6 | M-6 | CH$_2$=CH–CONH(CH$_2$)$_2$S–[–CH$_2$C(CH$_3$)(COOC$_{21}$H$_{43}$)–] |
| 7 | M-7 | CH$_2$=C(CH$_3$)–COO(CH$_2$)$_2$OCO(CH$_2$)$_2$COO(CH$_2$)$_2$S–[–(CH$_2$C(CH$_3$)(COOC$_{18}$H$_{37}$))$_{90}$–(CH$_2$C(CH$_3$)(COO(CH$_2$)$_2$COOC$_9$H$_{19}$))$_{10}$–] |
| 8 | M-8 | CH$_2$=CH–C$_6$H$_4$–COO(CH$_2$)$_3$S–[–CH$_2$C(CH$_3$)(COOC$_{20}$H$_{41}$)–] |
| 9 | M-9 | CH$_2$=C(CH$_3$)–COO(CH$_2$)$_2$OOC(CH$_2$)$_2$S–[–(CH$_2$C(CH$_3$)(COOC$_{14}$H$_{29}$))$_{95}$–(CH$_2$C(CH$_3$)(COOC$_2$HCH$_2$OCOC$_6$H$_{13}$)(OCOC$_6$H$_{13}$))$_5$–] |
| 10 | M-10 | CH$_2$=CH–CONH(CH$_2$)$_{10}$COO(CH$_2$)$_2$S–[–(CH$_2$C(CH$_3$)(COOC$_{18}$H$_{37}$))$_{90}$–(CH$_2$C(CH$_3$)(COOC$_8$H$_{17}$))$_{10}$–] |
| 11 | M-11 | CH$_2$=C(CH$_3$)–COO(CH$_2$)$_2$OOC(CH$_2$)$_2$S–[–(CH$_2$C(CH$_3$)(COOC$_{18}$H$_{37}$))$_{50}$–(CH$_2$CH(COOC$_{12}$H$_{25}$))$_{50}$–] |
| 12 | M-12 | CH$_2$=CH–COO(CH$_2$)$_2$COO(CH$_2$)$_2$S–[–CH$_2$C(CH$_3$)(COOC$_{16}$H$_{33}$)–] |

TABLE A-continued

Production Example of Mono-Functional Macromonomer (M)

| Production Example | Macromonomer (M) | Chemical Structure of Macromonomer (M) |
|---|---|---|
| 13 | M-13 | $CH_2=C(CH_3)-COOCH_2CHCH_2OOCCH_2S-[(CH_2C(CH_3))_{85}(CH_2C(CH_3))_{15}]-$ with $OH$, $COOC_{12}H_{25}$, $COO(CH_2)_2OOCC_{11}H_{23}$ |
| 14 | M-14 | $CH_2=C(CH_3)-COO(CH_2)_2NHCOO(CH_2)_2S-[CH_2C(CH_3)-COOC_{13}H_{27}]-$ |
| 15 | M-15 | $CH_2=CH-C_6H_4-CH_2NHCONH(CH_2)_4-[CH_2C(CH_3)-COOC_{14}H_{29}]-$ |

Production Example 1 of Dispersion Stabilizing Resin (P): (P-1)

A mixed solution of 97 g of octadecyl methacrylate, 3 g of monomer (B-1) having the following structure, and 200 g of toluene was heated to 70° C. with stirring under a nitrogen gas stream. Then, after adding to the mixture 1.2 g of A.I.B.N, the reaction was carried out 4 hours and after further adding thereto 0.8 g of A.I.B.N., the reaction was carried out 4 hours. After cooling, the reaction mixture was reprecipitated in one liter of methanol and the precipitates formed were recovered by filtration and dried to provide 78 g of the polymer (P-1) shown below having a weight average molecular weight (Mw) of $3.5 \times 10^4$.

Monomer(B-1):

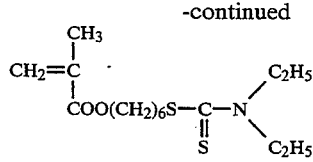

Resin [P-1]

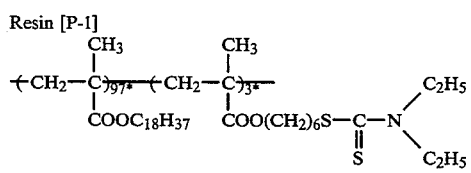

*(weight ratio)

Production Examples 2 to 12 of Dispersion Stabilizing Resins (P): (P-2) to (P-12)

By the method similar to Production Examples of the resin (P-1), each of the resins (P) shown in Table B below was produced. Mws of the polymers obtained were in the range of from $3 \times 10^4$ to $5 \times 10^4$.

TABLE B

Production Example of Dispersion Stabilizing Resin [P]

| Production Example | Resin [P] | Polymerization Components of Resin [P] (weight ratio) |
|---|---|---|
| 2 | P-2 | $-(CH_2-C(CH_3))_{96}(CH_2-C(CH_3))_{4}-$ with $COOC_{16}H_{33}$, $COO(CH_2)_{11}S-C(=S)-OCH(CH_3)_2$ |
| 3 | P-3 | $-(CH_2-C(CH_3))_{97}(CH_2CH)_3-$ with $COOC_{12}H_{25}$, $CONH(CH_2)_{10}S-C(=S)-N(CH_3)_2$ |

TABLE B-continued

Production Example of Dispersion Stabilizing Resin [P]

| Production Example | Resin [P] | Polymerization Components of Resin [P] (weight ratio) |
|---|---|---|
| 4 | P-4 | $\mathrm{+CH_2-C(CH_3)(COOC_{18}H_{37})\!\!\not{~}_{50}(CH_2CH(COOC_{12}H_{25}))\!\!\not{~}_{48}(CH_2-C(CH_3)(COO(CH_2)_2S-C(=S)-N(C_4H_9)_2))\!\!\not{~}_2}$ |
| 5 | P-5 | $\mathrm{+CH_2-C(CH_3)(COOC_{14}H_{29})\!\!\not{~}_{95}(CH_2-CH(COO(CH_2)_2OCO(CH_2)_5S-C(=S)-OC_2H_5))\!\!\not{~}_5}$ |
| 6 | P-6 | $\mathrm{+CH_2-C(CH_3)(COOC_{20}H_{41})\!\!\not{~}_{97}(CH_2-CH(C_6H_4-CH_2S-C(=S)-OC_4H_9))\!\!\not{~}_3}$ |
| 7 | P-7 | $\mathrm{+CH_2-CH(OC_{18}H_{37})\!\!\not{~}_{96}(CH_2CH(O(CH_2)_2S-C(=S)-N(C_4H_9)(C_2H_5)))_4-}$ |
| 8 | P-8 | $\mathrm{+CH_2-CH(OCOC_{17}H_{35})\!\!\not{~}_{96}(CH_2CH(OCO(CH_2)_3S-C(=S)-OCH_2C_6H_5))_4-}$ |
| 9 | P-9 | $\mathrm{+CH_2-C(CH_3)(COOC_{18}H_{37})\!\!\not{~}_{85}(CH_2CH(COO(CH_2)_2COO(CH_2)_2S-(CH_2C(CH_3)(COOC_{16}H_{33}))\!\!\not{~}))\!\!\not{~}_{10}(CH-CH(CONH(CH_2)_2S-C(=S)-NHC_4H_9))\!\!\not{~}_5}$ (M-12) |
| 10 | P-10 | $\mathrm{+CH_2-C(CH_3)(COOC_{12}H_{25})\!\!\not{~}_{82}(CH_2-C(CH_3)(COO(CH_2)_2OCO)CH_2)_2COO(CH_2)_2S-((CH_2C(CH_3)(COOC_{18}H_{37}))\!\!\not{~}_{90}(CH_2C(CH_3)(COO(CH_2)_2COOC_9H_{19}))\!\!\not{~}_{10}))\!\!\not{~}_{12}(CH_2-C(CH_3)(COO(CH_2)_2S-C(=S)-N((CH_2)_2Cl)(C_2H_5)))\!\!\not{~}_6}$ (M-7) |
| 11 | P-11 | $\mathrm{+CH_2-C(CH_3)(COOC_{14}H_{29})\!\!\not{~}_{85}(CH_2CH(CONH(CH_2)_2S-(CH_2C(CH_3)(COOC_{12}H_{43}))\!\!\not{~}))\!\!\not{~}_{10}(CH_2-C(CH_3)(COO(CH_2)_{10}S-C(=S)-OCH_2CH_2OCH_3))\!\!\not{~}_5}$ (M-6) |

TABLE B-continued

Production Example of Dispersion Stabilizing Resin [P]

| Production Example | Resin [P] | Polymerization Components of Resin [P] (weight ratio) |
|---|---|---|
| 12 | P-12 | 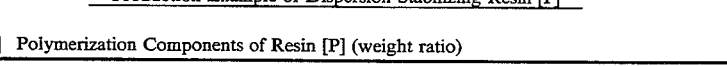 |

Production Example 13 of Dispersion Stabilizing Resin (P): (P-13)

A mixed solution of 100 g of hexadecyl methacrylate, 1.2 g of initiator (I-1) shown below, and 100 g of tetrahydrofuran was heated to 60° C. with stirring under a nitrogen gas stream. The solution was photopolymerized by light-irradiating it for 12 hours with a light-pressure mercury lamp of 400 watts from the distance of 10 cm through a glass filter.

The reaction mixture was reprecipitated in 1.5 liters of methanol and the precipitates were collected by filtration and dried to provide 80 g of a polymer (resin (P-13)) having Mw of $4.5 \times 10^4$.

Initiator(I-1):

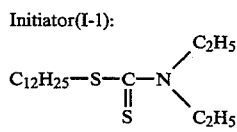

Resin (P-13):

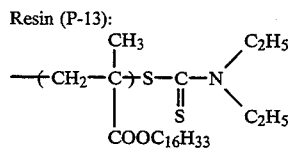

Production Examples 14 to 26 of Dispersion Stabilizing Resins (P): (P-14) to (P-26)

By following the same procedure as the production example of the resin (P-13) except that 100 g of each of the monomers shown in Table C below was used in place of 100 g of hexadecyl methacrylate, each of the polymers (P-14) to (P-26) was produced.

Mws of the polymers obtained were in the range of from $3.5 \times 10^4$ to $5 \times 10^4$.

TABLE C

Production Example of Dispersion Stabilizing Resin [P]

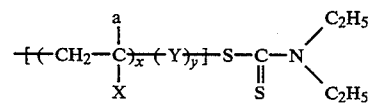

| Production Example | Resin [P] | a | X | —Y— | x/y (weight ratio) |
|---|---|---|---|---|---|
| 14 | P-14 | —CH₃ | —COOC₁₈H₃₇ | — | 100/0 |
| 15 | P-15 | —CH₃ | —COOC₁₂H₂₅ | — | 100/0 |
| 16 | P-16 | —CH₃ | —COOC₁₈H₃₇ | —CH₂CH—<br>    \|<br>    COOC₁₂H₂₅ | 70/30 |
| 17 | P-17 | —H | —OCOC₁₇H₃₅ | — | 100/0 |
| 18 | P-18 | —H | —OC₁₈H₃₇ | — | 100/0 |
| 19 | P-19 | —CH₃ | —COOC₂₀H₄₁ | — | 100/0 |
| 20 | P-20 | —CH₃ | —COOC₁₈H₃₇ |     CH₃<br>    \|<br>—CH₂—C—<br>    \|<br>    COO(CH₂)₂OCOC₁₁H₂₃ | 80/20 |
| 21 | P-21 | —CH₃ | —COOC₁₆H₃₃ |     CH₃<br>    \|<br>—CH₂C—<br>    \|<br>    COOC₁₄H₂₉ | 90/10 |
| 22 | P-22 | —CH₃ | —COOC₁₃H₂₇ |     CH₃<br>    \|<br>—CH₂C—<br>   /<br>COOCH₂CHCH₂OCOC₆H₁₃<br>    \|<br>    OCOC₆H₁₃ | 85/15 |

TABLE C-continued

Production Example of Dispersion Stabilizing Resin [P]

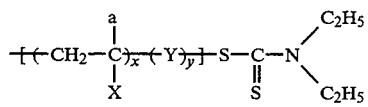

| Production Example | Resin [P] | a | X | —Y— | x/y (weight ratio) |
|---|---|---|---|---|---|
| 23 | P-23 | —CH$_3$ | —COOC$_{18}$H$_{37}$ | —CH$_2$CH—<br>\|<br>CONC$_{12}$H$_{25}$<br>\|<br>CH$_3$ | 80/20 |
| 24 | P-24 | —CH$_3$ | —COOC$_{12}$H$_{25}$ | —CH$_2$CH—<br>\|<br>CONHC$_{16}$H$_{33}$ | 60/40 |
| 25 | P-25 | —H | —COOC$_{13}$H$_{37}$ | — | 100/0 |
| 26 | P-26 | —H | —COOC$_{18}$H$_{37}$ | — | 100/0 |

Production Example 27 of Dispersion Stabilizing Resin (P): (P-27)

A mixture of 90 g of octadecyl methacrylate, 10 g of macromonomer (M-2), 0.9 g of the initiator (I-2) shown below, and 100 g of toluene was heated to 50° C. under a nitrogen gas stream. The solution was photopolymerized by light-irradiating it for 12 hours with a high-pressure mercury lamp of 400 watts from a distance of 10 cm through a glass filter. The reaction mixture was reprecipitated in 1.5 liters of methanol and the precipitates formed were collected by filtration and dried to provide 80 g of the polymer (resin (P-27)) having Mw of $5 \times 10^4$.

Initiator(I-2):

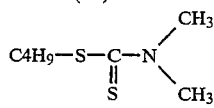

Resin (P-27):

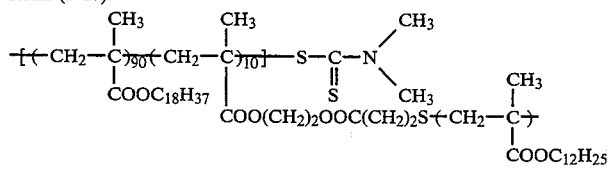

Production Examples 28 to 39 of Dispersion Stabilizing Resins (P): (P-28) to (P-39)

By following the same procedure as the production Example of the resin (P-27) except that 0.03 mol of each of the initiators described in Table D shown below in place of 0.9 g of the initiator (I-2), each of the polymers (P-28) to (P-39) was produced.

Mws of the polymers obtained were in the range of from $4 \times 10^4$ to $5 \times 10^4$.

TABLE D

Production Example of Dispersion Stabilizing Resin [P]

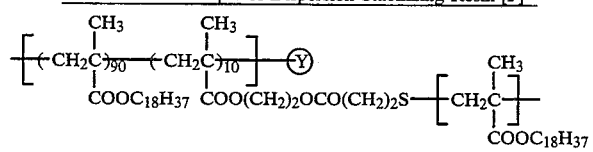

| Production Example | Resin [P] | Initiator [I] | —Y— |
|---|---|---|---|
| 28 | P-28 | C$_3$H$_7$—S—C—N(CH$_2$CH$_2$OH)$_2$<br>‖<br>S<br>[I-3] | —S—C—N(CH$_2$CH$_2$OH)$_2$<br>‖<br>S |

TABLE D-continued

Production Example of Dispersion Stabilizing Resin [P]

$$\left[-(CH_2C(CH_3))_{\overline{90}} -(CH_2C(CH_3))_{\overline{10}}-\right] -\!\!\text{\textcircled{Y}} \qquad \left[-CH_2C(CH_3)(COOC_{18}H_{37})-\right]$$
$$COOC_{18}H_{37} \quad COO(CH_2)_2OCO(CH_2)_2S-$$

| Production Example | Resin [P] | Initiator [I] | —Ⓨ |
|---|---|---|---|
| 29 | P-29 | $C_6H_5CH_2-S-C(=S)-N(C_2H_5)_2$ [I-4] | $-S-C(=S)-N(C_2H_5)_2$ |
| 30 | P-30 | $C_6H_{13}-S-C(=S)-OCH(CH_3)_2$ [I-5] | $-S-C(=S)-OCH(CH_3)_2$ |
| 31 | P-31 | $C_4H_9-S-C(=S)-O-CH_2C_6H_5$ [I-6] | $-S-C(=S)-OCH_2C_6H_5$ |
| 32 | P-32 | $C_{12}H_{25}-S-C(=S)-N(CH_2CH_2CN)(C_2H_5)$ [I-7] | $-S-C(=S)-N(CH_2CH_2CN)(C_2H_5)$ |
| 33 | P-33 | $C_2H_5-S-C(=S)-N(CH_2C_6H_5)_2$ [I-8] | $-S-C(=S)-N(CH_2C_6H_5)_2$ |
| 34 | P-34 | $C_5H_{11}-S-C(=S)-NH(CH_2)_2COOH$ [I-9] | $-S-C(=S)-NH(CH_2)_2COOH$ |
| 35 | P-35 | $HO(CH_2)_3-S-C(=S)-N(CH_3)(CH_2)_3COOCH_3$ [I-10] | $-S-C(=S)-N(CH_3)(CH_2)_3COOCH_3$ |
| 36 | P-36 | $C_6H_5CH_2-S-C(=S)-OC_4H_9$ [I-11] | $-S-C(=S)-O-C_4H_9$ |
| 37 | P-37 | $C_4H_9-S-C(=S)-O(CH_2CH_2O)_{\overline{7}}CH_3$ [I-12] | $-S-C(=S)-O(CH_2CH_2O)_{\overline{7}}CH_3$ |
| 38 | P-38 | $C_8H_{17}-S-C(=S)-NH(CH_2)_3Si(CH_3)_3$ [I-13] | $-S-C(=S)-NH(CH_2)_3Si(CH_3)_3$ |
| 39 | P-39 | $C_{10}H_{21}-S-C(=S)-O(CH_2)_2\text{-(tetrahydropyran)}$ [I-14] | $-S-C(=S)-O(CH_2)_2\text{-(tetrahydropyran)}$ |

Production Examples 40 to 48 of Dispersion Stabilizing Resins (P) (P-40) to (P-48)

By following the same procedure as the production example of the resin (P-27) except that each of the monomers and each of the macromonomers described in Table E shown below were used in place of 90 g of octadecyl methacrylate and 10 g of the macromonomer (M-2), each of the polymers (P40) to (P-48) was produced.

Mws of the polymers obtained were in the range of from $4 \times 10^4$ to $6 \times 10^4$.

TABLE E

Production Example of Dispersion Stabilizing Resin [P]

| Production Example | Resin [P] | Monomer | | Macromonomer (M) | |
|---|---|---|---|---|---|
| 40 | P-40 | Hexadecyl methacrylate | 85 g | M-3 | 15 g |
| 41 | P-41 | Docosenyl methacrylate | 90 g | M-4 | 10 g |
| 42 | P-42 | Dodecyl methacrylate | 90 g | M-5 | 10 g |
| 43 | P-43 | Tridecyl methacrylate | 67 g | M-6 | 13 g |
|    |      | Dodecyl acrylate | 20 g | | |
| 44 | P-44 | Dodecyl methacrylate | 80 g | M-7 | 20 g |
| 45 | P-45 | 4-(Dodecyloxycarbonyl)styrene | 70 g | M-8 | 15 g |
|    |      | Octadecyl methacrylate | 15 g | | |
| 46 | P-46 | Eicosanyl methacrylate | 80 g | M-9 | 20 g |
| 47 | P-47 | Octadecyl acrylate | 84 g | M-13 | 16 g |
| 48 | P-48 | Dodecyl acrylate | 60 g | M-14 | 10 g |
|    |      | Octadecyl methacrylate | 30 g | | |

Production Example 49 of Dispersion Stabilizing Resin (P): (P-49)

A mixed solution of 85 g of tetradecyl methacrylate, 15 g of the macromonomer (M-11), and 200 g of tetrahydrofuran was heated to 65° C. with stirring under a nitrogen gas stream.

Then, after adding 3 g of A.C.V. to the mixture, the reaction was carried out for 4 hours and after further adding thereto 1.0 g of A.C.V., the reaction was carried out for 4 hours. After cooling the reaction mixture, 2 g of the compound (A) shown below was added to the reaction mixture, furthermore, a mixed solution of 4 g of D.C.C., 0.5 g of 4-(N,N-dimethylamino)pyridine, and 10 g of methylene chloride was added dropwise thereto at 25° C. over a period of one hour, and after further carrying out the reaction as they were, 10 g of an aqueous solution of 85% formic acid was added to the reaction mixture followed by stirring for 2 hours.

Precipitates thus formed were collected by filtration, reprecipitated in one liter of methanol twice, and the precipitates formed were collected by filtration and dried to provide 60 g of the polymer (resin (P-49)) having Mw of $6 \times 10^4$.

was photopolymerized by irradiating it with a high-pressure mercury lamp of 400 watts for 10 hours from a distance of 10 cm through a glass filter. After cooling, the reaction mixture was filtered with a nylon cloth of 200 mesh to provide a white dispersion, which was a latex having a polymerization ratio of 98% and a mean particle size of 0.18 μm. The particle size was measured by CAPA-500 (trade name, made by HORIBA, Ltd.).

Then, under the same synthesis conditions as Production Example 1 of the dispersed resin particles of the present invention, that is, by the concentration (40% by weight) of a monomer (A) and the concentration (8% by weight to the monomer) of a dispersion stabilizing resin (P), a comparison test was carried out using a conventional polymerization reaction.

Comparison Example 1: RD-1

A mixed solution of 8 g of a dispersion stabilizing resin (RP-1) having the structure shown below, 50 g of methyl methacrylate, 50 g of methyl acrylate, and 150 g of Isopar H was heated to 60° C. with stirring under a nitrogen gas steam. To the mixture was added 0.8 g of 2,2'-azobis(isovaleronitrile) (A.I.V.N.) and the polymerization reaction was initiated.

With the progress of the reaction, after 10 minutes, a white turbidity formed, after one hour, aggregates formed, and after 2 hours, a polymer formed was precipitated.

Compound(A):

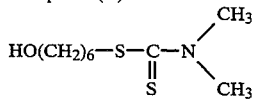

Resin (P-49):

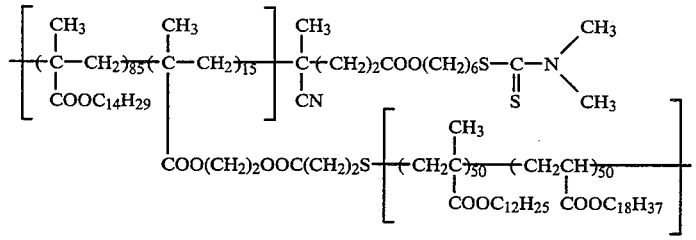

Production Example 1 of Dispersed Resin Particles:
D-1 and Comparison Examples 1 and 2

A mixed solution of 8 g of the dispersion stabilizing resin (P-14), 50 g of methyl methacrylate, 50 g of methyl acrylate, and 150 g of Isopar H was heated to 50° C. with stirring under a nitrogen gas stream. The solution Comparison Dispersion Stabilizing Resin (RP-1):

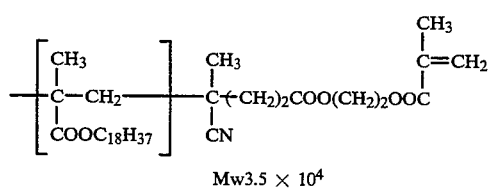

Mw $3.5 \times 10^4$

Then, a synthesis example (comparison example) capable of polymerization granulation using a polymerization initiator was shown below.

Comparison Example 2: RD-2

A mixed solution of 25 g of the dispersion stabilizing resin (RP-1) described above, 50 g of methyl methacrylate, 50 g of methyl acrylate, and 566 g of Isopar H was heated to 60° C. with stirring under a nitrogen gas stream. Then, after adding to the reaction mixture, 0.8 g of A.I.V.N., the reaction was carried out for 2 hours and after further adding thereto 0.5 g of A.I.V.N., the reaction was carried out for 3 hours. After cooling, the reaction mixture obtained was filtered through a nylon cloth of 200 mesh to provide a white dispersion, which was a latex having a polymerization ratio of 92% and a mean particle size of 0.25 μm.

As described above, in the process of polymerization granulation with the conventionally known polymerization initiator, the granulation of a resin was possible by lowering the concentration of the monomer and by using a dispersion stabilizing resin having a polymerizable double bond group in an amount of more than three times as compared with the method of the present invention.

This is assumed to be caused by that the bonding effect of the dispersion stabilizing resin (RP-1) to the polymer of the monomer (A) which is insolubilized by causing a polymerization reaction is lowered as compared with the process of the present invention.

Then, after preparing an Isopar G dispersion of the solid component concentration of 10% by weight using each of the resin particles (D-I) of the present invention and the resin particles (RD-2) obtained in Comparison Example 2, each dispersion was subjected to a centrifugal precipitation under a forced condition of a rotation number of $1 \times 10^3$ r.p.m. for 10 minutes, thereafter, the precipitates obtained were allowed to stand in a ultrasonic wave generator for 30 minutes, and the redispersibility of the resin particles was compared.

As the results, in the resin particles (D-1) of the present invention, the existence of coarse particles was not found by a visual observation and also by the measurement with CAPA-500, the particle size distribution was almost same as that before the centrifugal precipitation and no change was observed.

On the other hand, in the comparison resin particles (RD-1), the existence of many coarse resin particles was visually observed. Furthermore, when the particle size distribution was measured by CAPA-500, the mean particle size of 0.25 μm before the centrifugal precipitation was changed to 0.40 μm, i.e., the particle size distribution was very broadened and it is observed that the resin particles having particle sizes of at least 1 μm were contained in an amount of 30%.

The excellence of the redispersion stability of the resin particles of the present invention is considered to be caused by that a sufficient amount of the dispersion stabilizing resin having a solvation property is chemically bonded to the resin particle portion of a non-solvation property with a good efficiency. In other words, in the resin particles of the present invention, the resin composed of an AB block copolymer of a polymer portion of solvation and a polymer portion of non-solvation is in a dispersed state.

Production Example 2 of Dispersed Resin Particles:
D-2 and Comparison Examples 3 and 4

A mixed solution of 5 g of the dispersion stabilizing resin (P-40), 100 g of vinyl acetate, and 145 g of Isopar H was heated to 60° C. with stirring under a nitrogen gas stream. The solution was photopolymerized by light-irradiating with a high-pressure mercury lamp of 400 watts for 10 hours from a distance of 10 cm through a glass filter. After cooling, the polymerization product was filtered through a nylon cloth of 200 mesh to provide a white dispersion, which was a latex having a polymerization ratio of 98% and a mean particle size of 0.18 μm. In addition, the particle sizes were measured by CAPA-500.

Then, as described in the case of Production Example 1, the comparison examples of carrying out the polymerization granulation by conventional polymerization reactions are shown below.

Comparison Example 3: RD-3

A mixed solution of 5 g of the dispersion stabilizing resin (RP-2) having the structure shown below, 100 g of vinyl acetate, and 145 g of Isopar H was heated to 60° C. with stirring under a nitrogen gas stream. Then, 0.8 g of A.I.V.N was added to the solution as a polymerization initiator and the polymerization reaction was initiated. With the progress of the reaction, after 10 minutes, a white turbidity occurred and further after 1.5 hours, a large amount of precipitates formed, whereby a dispersion was not obtained.

Comparison Dispersion Stabilizing Resin (RP-2)

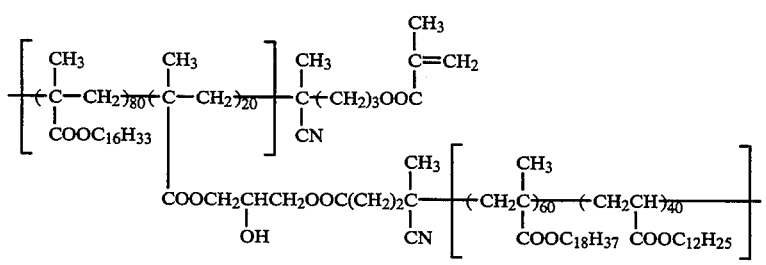

Mw $4 \times 10^4$

Comparison Example 4: RD-4

A mixed solution of 10 g of the dispersion stabilizing resin (RP-2) described above, 100 g of vinyl acetate, and 400 g of Isopar G was heated to 70° C. with stirring under a nitrogen gas stream. After adding to the solution 1.2 g of A.I.V.N., the reaction was carried out for 2 hours, then after adding thereto 0.5 of A.I.V.N, the reaction was carried out for 2 hours, and after further adding thereto 0.5 g of A.I.V.N., the reaction was carried out for 2 hours. Then, the temperature of the reaction mixture was raised to 100° C. to distill off unreacted vinyl acetate. After cooling, the reaction mixture was filtered through a nylon cloth of 200 mesh to provide a white dispersion, which was a latex having a polymerization ratio of 88% and a mean particle size of 0.19 μm.

Then, on the dispersed resin particles (D-2) of the present invention and the comparison dispersed resin particles (RD-4) obtained as above, the redispersibility was evaluated by the same manner as the case of Production Example 1.

In the dispersed resin particles (D-2) of the present invention, the change of the particle size distribution after the redispersion was not observed.

On the other hand, in the comparison sample (RD-4), after the redispersion, many coarse particles formed by aggregation were observed and also as the result of measuring the particle size distribution by CAPA-500, it was found that the mean grain size was changed to 0.45 μm and resin particles having particle sizes of 1 μm or more were contained in an amount of 25%.

From the above results, it could be seen that the dispersed resin particles obtained by the production process of the present invention showed very good dispersion stability and redispersion stability.

Production Example 3 of Dispersed Resin Particles: D-3 and Comparison Examples 5 and 6

A mixed solution of 10 g of the dispersion stabilizing resin (P-3), 70 g of benzyl methacrylate, 30 g of benzyl acrylate, and 290 g of Isopar H was heated to 40° C. with stirring under a nitrogen gas stream.

The solution was light-irradiated for 8 hours under the same light-irradiation condition as in Production Example 1. After cooling, the product was filtered through a nylon cloth of 200 mesh to provide a white dispersion, which was a latex having a polymerization ratio of 98% and a mean particle size of 0.25 μm.

Comparison Example 5: RD-5

A mixed solution of the dispersion stabilizing resin (RP-3) having the structure shown below, 70 g of benzyl methacrylate, 30 g of benzyl acrylate, and 542 g of Isopar H was heated to 50° C. with stirring under a nitrogen gas stream. Then, after adding to the solution 0.8 g of 2,2'-azobis(2 -cyclopropionitrile) (A.C.P.P.), the reaction was carried out for 3 hours and after further adding thereto 0.5 g of A.C.P.P., the reaction was carried out for 2 hours. Also, the temperature of the system was raised to 75° C. and after further adding thereto 0.5 g of A.I.V.N., the reaction was carried out for 3 hours.

After cooling, the reaction mixture was filtered through a nylon cloth of 200 mesh to provide a white dispersion having a mean grain size of 1.2 μm and a very broad particle size distribution.

Comparison Dispersion Stabilizing Resin (RP-3)

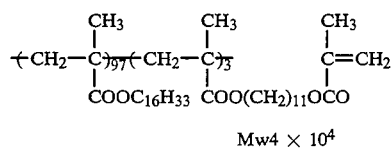

$Mw 4 \times 10^4$

Comparison Example 6: RD-6

A mixed solution of 25 g of the dispersion stabilizing resin (RP-3) and 547 g of Isopar H was heated to 50° C. with stirring under a nitrogen gas stream. Then, to the solution was added dropwise a mixed solution of 70 g of benzyl methacrylate, 30 g of benzyl acrylate, and 0.8 g of A.C.P.P. over a period of one hour. After 2 hours since the end of the addition of the mixed solution, 0.5 g of A.C.P.P. was added to the mixture and the reaction was carried out for 2 hours. Also, after further adding thereto 0.5 g of A.I.V.N., the reaction was carried out for 3 hours at 75° C.

The white dispersion thus obtained was a dispersion of resin particles having a polymerization ratio of 95% and a mean particle size of 0.26 μm.

On each of the dispersed resin particles (D-3) of the present invention and the comparison dispersed resin particles (RD-6) thus obtained, the redispersibility was evaluated by the same manner as the case of Production Example 1.

In the dispersed resin particles (D-3) of the present invention, the change of the particle size distribution after the redispersion was not observed.

On the other hand, in the comparison dispersed resin particles (RD-6), many coarse particles formed by aggregation after the redispersion were observed and about a half of the particles were precipitated without dispersing.

From the above results, it could be seen that the dispersed resin particles obtained by the production process of the present invention showed very good dispersion stability and redispersion stability.

Production Examples 4 to 17 of Dispersed Resin Particles: D-4 to D-7

By following the same procedure as Production Example 1 of dispersed resin particles except for using each of the dispersion stabilizing resins described in Table F shown below in place of 8 g of the dispersion stabilizing resin (P-14), the dispersed resin particles (D-4) to (D-17) were produced.

The mean particle sizes of the resin particles in the dispersions obtained were in the range of from 0.15 μm and the particle size distributions were sharp.

TABLE F

| Production Example of Dispersed Resin Particles | | |
|---|---|---|
| Production Example | Dispersion Resin Particles | Dispersion Stabilizing Resin [P] and Amount |
| 4 | D-4 | P-1 10 g |
| 5 | D-5 | P-5 9 g |
| 6 | D-6 | P-10 10 g |
| 7 | D-7 | P-17 8 g |
| 8 | D-8 | P-18 9 g |
| 9 | D-9 | P-22 10 g |
| 10 | D-10 | P-26 10 g |
| 11 | D-11 | P-27 7 g |
| 12 | D-12 | P-30 7 g |
| 13 | D-13 | P-38 7 g |
| 14 | D-14 | P-41 8 g |

TABLE F-continued

| Production Example of Dispersed Resin Particles | | |
|---|---|---|
| Production Example | Dispersion Resin Particles | Dispersion Stabilizing Resin [P] and Amount |
| 15 | D-15 | P-49   8 g |
| 16 | D-16 | P-39   8 g |
| 17 | D-17 | P-31   8 g |

Production Examples 18 to 38 of Dispersed Resin Particles: D-18 to D-38

Each solution obtained by dissolving each definite amount of each compound described in Table G shown below with respect to the dispersion stabilizing resin (P) and the monomer (A) in 125 g of Isopor H was heated to 50° C. with stirring under a nitrogen gas stream. The solution was light-irradiated for 12 hours under the same condition as Production Example D-1.

Then, the reaction mixture was heated to 100° C. at a reduced pressure of from 10 to 15 mmHg to distill off the unreacted monomer. After cooling, the product was filtered through a nylon cloth of 200 mesh to provide each white dispersion of resin particles.

All the dispersed resin particles thus obtained showed a good mono-dispersibility and the mean particle sizes were in the range of from 0.15 to 0.25 μm.

TABLE G

| Production Example of Dispersion Resin Particles | | | | | | |
|---|---|---|---|---|---|---|
| Production Example | Dispersed Resin Particles [D] | Monomer (A) | | Dispersion Stabilizing Resin [P] | | Polymerization Ratio (weight % from solid component) |
| 18 | D-18 | Vinyl acetate | 100 g | P-4 | 18 g | 90% |
| 19 | D-19 | Vinyl acetate | 80 g | P-9 | 12 g | 88% |
|    |      | Vinyl propionate | 20 g | | | |
| 20 | D-20 | Methyl methacrylate | 75 g | P-11 | 16 g | 98% |
|    |      | Ethyl methacrylate | 25 g | | | |
| 21 | D-21 | Ethyl methacrylate | 100 g | P-13 | 10 g | 98% |
| 22 | D-22 | Benzyl methacrylate | 100 g | P-31 | 12 g | 96% |
| 23 | D-23 | Methyl methacrylate | 60 g | P-16 | 10 g | 98% |
|    |      | Ethyl methacrylate | 30 g | | | |
|    |      | Acrylic acid | 10 g | | | |
| 24 | D-24 | Styrene | 55 g | P-26 | 20 g | 85% |
|    |      | Vinyltoluene | 45 g | | | |
| 25 | D-25 | Vinyl acetate | 95 g | P-34 | 10 g | 86% |
|    |      | Crotonic acid | 5 g | | | |
| 26 | D-26 | Vinyl methyl ether | 20 g | P-38 | 8 g | 88% |
|    |      | Vinyl acetate | 80 g | | | |
| 27 | D-27 | Ethyl methacrylate | 95 g | P-41 | 12 g | 98% |
|    |      | N,N-Dimethylaminoethyl methacrylate | 5 g | | | |
| 28 | D-28 | Methyl methacrylate | 95 g | P-22 | 11 g | 97% |
|    |      | Hexadecyl acrylate | 5 g | | | |
| 29 | D-29 | Styrene | 50 g | P-33 | 10 g | 88% |
|    |      | Vinyl acetate | 50 g | | | |
| 30 | D-30 | Vinyl acetate | 98.5 g | P-45 | 10 g | 89% |
|    |      | Octadecyl methacrylate | 1.5 g | | | |
| 31 | D-31 | Vinyl acetate | 98 g | P-30 | 10 g | 92% |
|    |      | Dodecyl methacrylate | 2 g | | | |
| 32 | D-32 | Vinyl acetate | 97 g | P-17 | 14 g | 89% |
|    |      | $CH_2=C(CH_3)COOCH_2CHCH_2OCOC_5H_{11}$ with $OCOC_5H_{11}$ | 3 g | | | |
| 33 | D-33 | Methyl methacrylate | 66 g | P-35 | 12 g | 96% |
|    |      | Methyl acrylate | 30 g | | | |
|    |      | $CH_2=CH\text{—}COO(CH_2)_2OCOC_9H_{19}$ | 4 g | | | |
| 34 | D-34 | Methyl methacrylate | 78 g | P-47 | 12 g | 99% |
|    |      | Butyl acrylate | 20 g | | | |
|    |      | Octadecyl acrylate | 2 g | | | |
| 35 | D-35 | Vinyl acetate | 95 g | P-49 | 10 g | 92% |
|    |      | $CH_2=C(CH_3)COO(CH_2)_2COO(CH_2)_2COOC_6H_{13}$ | 5 g | | | |
| 36 | D-36 | Benzyl methacrylate | 92 g | P-33 | 15 g | 98% |
|    |      | $CH_2=CH\text{—}COOCH_2\text{—}C_6H_4\text{—}COOC_{10}H_{21}$ | 8 g | | | |
| 37 | D-37 | Methyl vinyl ether | 97 g | P-18 | 16 g | 86% |
|    |      | Octadecyl vinyl ether | 3 g | | | |

TABLE G-continued

Production Example of Dispersion Resin Particles

| Production Example | Dispersed Resin Particles [D] | Monomer (A) | | Dispersion Stabilizing Resin [P] | | Polymerization Ratio (weight % from solid component) |
|---|---|---|---|---|---|---|
| 38 | D-38 | Methyl methacrylate<br>Ethyl acrylate<br>Dodecyl acrylate | 75 g<br>15 g<br>10 g | P-22 | 13 g | 98% |

Comparison Production Example 7 of Dispersed Resin Particles: RD-7

By following the same procedure as Comparison Production Example 2 (RD-2) described above except that 20 g of the dispersion stabilizing resin (RP-2) described above was used in place of 25 g of the dispersion stabilizing resin (RP-1), a white dispersion of latex particles having a polymerization ratio of 93% and a mean particle size of 0.22 μm was obtained.

Comparison Production Example 8 of Dispersed Resin Particles: RD-8

By following the same procedure as Comparison Production Example 4 (RD-4) described above except that 14 g of the dispersion stabilizing resin (RP-1) described above was used in place of 10 g of the dispersion stabilizing resin (RP-2), a white dispersion of latex particles having a polymerization ratio of 88% and a mean particle size of 0.18 μm was obtained.

Example 1 of Liquid Developer

After placing 10 g of a dodecyl methacrylate/acrylic acid copolymer (copolymerization ratio: 95/5 by weight ratio), 10 g of Nigrosine, and 30 g of Isopar G together with glass beads in a paint shaker (manufactured by Tokyo Seiki K.K.), they were dispersed for 4 hours to provide a dispersion of Nigrosine.

Then, by diluting 6.5 (as solid components) of the resin dispersion (D-2) obtained in Production Example 2 of dispersed resin particles, 2.5 g of the Nigrosine dispersion described above, 15 g of branched octadecyl alcohol FOC-180 (made by Nissan Chemical Industries, Ltd.), and 0.07 g of an octadecene-half maleic acid octadecylamide copolymer with one liter of Isopar G, a liquid developer for electrostatic photography was prepared.

Preparation of Comparison Liquid Developers A and B

By following the production of the liquid developer described above except that each of the resin dispersions shown below was used in place of the resin dispersion (D-2), two kinds of comparison liquid developers A and B were prepared.

Comparison Liquid Developer A:
Resin dispersion (RD-4) prepared in Comparison Example 4 of dispersed resin particles was used.

Comparison Liquid Developer B:
Resin dispersion (RD-7) prepared in Comparison Example 7 of dispersed resin particles was used.

By using each of these liquid developers thus prepared as the liquid developer for an all automatic plate-making machine ELP404V (trade name, manufactured by Fuji Photo Film Co.), ELP Master II Type (trade name, manufactured by Fuji Photo Film Co.) which was an electrophotographic photoreceptor was exposed and developed. The plate making speed was 7 plates/minutes. Furthermore, the presence of stains by the attachment to toners to the development apparatus after processing 3,000 plates of ELP Master II Type was observed. The blackened ratio (imaged area) of the duplicated image was evaluated using an original of 30%.

The results obtained are shown in Table H.

TABLE H

| No. | Test | Developer | Staining of Developing Apparatus | Image of the 3,000th Plate |
|---|---|---|---|---|
| 1 | Invention | Example 1 | ○<br>No toner residue formed | ○<br>Clear |
| 2 | Comparative Example A | Developer A | x<br>Toner residue formed | x<br>Lacking of character, blurring of solid black portion, occurrence of background fog |
| 3 | Comparative Example B | Developer B | ○<br>Toner residue formed | Δ<br>Blurring of fine line, etc., slightly observed. Lowering of Dmax |

When printing plates were prepared using each of the liquid developers under the foregoing plate-making condition, the developer which did not cause stains on the developing apparatus and gave clear images on the 3,000th printing plate was only the liquid developer of the present invention.

On the other hand, printing was conducted by an ordinary manner using each offset printing master plate (ELP plate) obtained by using each liquid developer, the number of prints until lacking of characters, blurs on the solid black portion, etc., formed on the images of a print was compared.

Each printing master plate obtained by using each liquid developer directly after plate-making gave more than 10,000 prints having good printed images.

However, when each liquid developer was used under severe plate-making conditions (conventionally, the plate-making speed was 2 or 3 plates/minute and the blackened ratio of the duplicated image was about 8 to 10%), the 3,000th master plate had clear images in the case of using only the liquid develope of the present invention, and in the comparison liquid developer A and the comparison liquid developer B, bad influences (lowering of $D_{max}$, blurring of fine lines, black pepper-form stains on the non-imaged portions, etc.) were observed on the image quality of the images of the 3,000th master plate.

This is because in the comparison liquid develope A and the comparison liquid developer B, when the liquid developer is used repeatedly for a long period of time, stains form on the developing apparatus (in particular, on the back surface of the electrode) by the developer since the resin particles of the liquid developer is insufficient in the redispersion stability, whereby the developing electrode does not sufficiently function to reduce the image quality, and further the resin particles attached on the developing apparatus are aggregated to form coarse particles which attach at random to the master plate to cause stains at the non-imaged portions.

Accordingly, when printing was conducted by using the 3,000th master plate obtained using the comparison liquid developer A and the comparison liquid developer B, stains at the non-imaged portions and lacking of images occurred even on the 1st print.

These results show that the resin particles of the present invention are clearly excellent.

Example 2 of Liquid Developer

By diluting 6 g (as solid components) of the resin dispersion (D-1) obtained in Production Example 1 of dispersed resin particles, 15 g of branched hexadecyl alcohol FOC-1600 (trade name, made by Nissan Chemical Industries, Ltd.), and 0.08 g of an octadecyl vinyl ether/half maleic acid dodecylamide copolymer with one liter of Isopar G, a liquid developer for electrostatic photography was prepared.

Preparation of Comparison Liquid Developers C and D

By following the same procedure as the production of the liquid developer described above except that each of the resin dispersions shown below was used in place of the resin dispersion (D-I), the comparison liquid developers C and D were prepared.

Comparison Liquid Developer C:

Resin dispersion (RD-2) prepared in Comparison Production Example 2 of dispersed resin particles was used.

Comparison Liquid Developer D:

Resin dispersion (RD-8) prepared in Comparison Production Example 8 of dispersed resin particles was used.

These liquid developers were used for an electrophotographic plate-making system and various characteristics were evaluated. The results obtained are shown in Table I.

TABLE I

| No. | Test | Developer | Staining of Developing Apparatus | Image of the 3,000th Plate |
|---|---|---|---|---|
| 1 | Invention | Example 2 | ○ No toner residue formed | ○ Clear |
| 2 | Comparative Example C | Developer C | x Toner residue formed | Δ Blurring of fine line, etc., slightly observed. Lowering of Dmax |
| 3 | Comparative Example D | Developer D | x~Δ Toner residue formed a little | x Lacking of character, blurring of solid black portion, occurrence of background fog |

In Table I, the measurement of stains of the developing apparatus and the evaluations of the image of the 3,000th master plate were conducted as in Example 1. Also, other terms were evaluated as follows.

(Note): Preparation of Plate Image

Preparation of Electrophotographic Photoreceptor P-1

In a 500 milli-liter glass-made container were placed 1.9 parts by weight of an X-type nonmetal phthalocyanine (made by Dainippon Ink and Chemicals, Inc.) as an organic photoconductive compound, 0.15 parts by weight of the thiobarbituric acid compound having the structure shown below, 17 parts by weight of the binder resin B-1 having the structure shown below, and 100 parts by weight of a mixed solution of tetrahydrofuran and cyclohexan at 8/2 by weight ratio together with glass beads and after dispersing with a paint shaker for 60 minutes, the glass beads were filtered away to provide a dispersion for a photoconductive layer.

Then, the dispersion for photoconductive layer was coated on a grained aluminum plate of 0.25 mm in thickness and dried to provide a printing master plate for electrophotographic plate making having a photoconductive layer of 6.0 μm in dry thickness.

Binder Resin B-1:

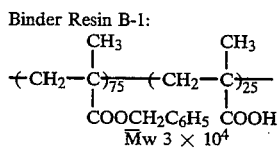

$\overline{M}w\ 3 \times 10^4$

Thiobarbituric Acid Compound:

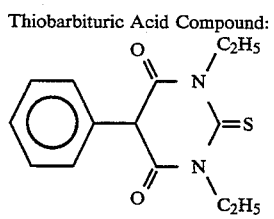

After electrostatically charging the surface of an electrophotographic photoreceptor P-1 prepared as shown above to a potential of +450 volts in the dark, the surface of the photoreceptor was exposed by a gallium-aluminum-arsenic semiconductor laser (oscillation wavelength 780 nm) of 2.8 mW output as a light source under an exposure of 60 ergs/cm² at a pitch of 25 μm, and a scanning speed of 300 meters/sec. and then developed using each of the liquid developers described above by applying a bias voltage of 30 volts to the counter electrode to obtain a toner image. Furthermore, the toner image was fixed by heating to 100° C. for one minute.

Each master plate thus obtained was immersed in a processing liquid E-1 having the following composition for 30 seconds to remove the photoconductive layer at the non-imaged portions and after washing with water for 30 seconds, air-dried with a dryer.

Composition of Processing Liquid E-1:

| Potassium Silicate | 40 g |
|---|---|
| Potassium Hydroxide | 10 g |
| Ethanol | 100 g |
| Water | 800 g |

The existence of lacking of fine lines and fine characters of the imaged portions of the printing master plate was visually evaluated with a magnifying lens (made by PEAK K.K.) of 60 magnifications.

Then, when printing plates were made using each of the liquid developers under the plate-making conditions described above, only the liquid developer of the present invention did not stain the developing apparatus and gave clear images on the 3,000th printing plates.

After gumming each offset printing plate prepared by treating each master plate under the same condition as described above in (Note), the printing plate was mounted on an offset printing machine, (Oliver Model 52, manufactured by Sakurai Seisakusho K.K.) and the number of prints obtained without causing background stains on the non-imaged portions of the print and problems on the quality of the imaged portions thereof was determined (the larger number of the prints shows the better printing resistance).

The master plates obtained using the liquid developers directly after the initiation of plate-making gave a print having good printed images even after printing more than 100,000 prints.

However, the 3,000th master plate only obtained using the liquid developer of the present invention had clear images, and in the case of using the comparison liquid developer C and the comparison liquid developer D, bad influences (lower of $D_{max}$, blurring of fine lines, black pepper-form stains on the non-imaged portions, etc.) were observed on the image quality of the images formed on the 3,000th master plate.

This is because in the comparison liquid developer C and the comparison liquid developer D, when the liquid developer is used repeatedly for a long period of time, stains form on the developing apparatus (in particular, on the back surface of the electrode) since the resin particles in the liquid developer are insufficient in the redispersion stability, whereby the developing electrode does not sufficiently function and reduces the image quality, and further resin particles attached onto the developing apparatus aggregate to form coarse particles which attach at random on the plate to cause background stains on the non-imaged portions.

Accordingly, when printing was conducted using the 3,000th printing plate obtained using the comparison liquid developer C and the comparison liquid developer D, background stains on the non-imaged portions and lacking on the imaged portions formed on the 1st print.

These results show that the resin particles of the present invention are clearly excellent.

Examples 3 to 18 of Liquid Developer

By following the same procedure as Example 1 of liquid developer except that 6.5 g (solid components) of each of the dispersed resin particles described in Table J shown below was used in place of 6.5 g of the dispersed resin particles (D-2), each of liquid developers was prepared.

TABLE J

| Example | Dispersed Resin Particles (D) |
| --- | --- |
| 3 | D-18 |
| 4 | D-19 |
| 5 | D-20 |
| 6 | D-1 |
| 7 | D-11 |
| 8 | D-14 |
| 9 | D-15 |
| 10 | D-24 |
| 11 | D-30 |
| 12 | D-31 |
| 13 | D-32 |
| 14 | D-35 |
| 15 | D-37 |
| 16 | D-34 |
| 17 | D-33 |
| 18 | D-38 |

Each liquid developer was operated by the same manner as in Example 1 and the properties were determined. Each of the liquid developers of Examples 3 to 10 showed a good result even after making 3,000 printing plates as in Example 2.

Furthermore, each of the liquid developers 11 to 18 each using the dispersion obtained by polymerization granulation of the monomer (A) of the present invention in the presence of a small amount of a monofunctional monomer having a long chain alkyl group copolymerizable with the foregoing monomer or a monofunctional monomer having at least two polar groups, had better properties and after making 3,500 printing plates, stains did not form on the developing apparatus and the images on the 3,500th printing plate had no stains and was clear.

As described above, each of the liquid developers of the present invention showed the good result.

Examples 19 to 36

By following the same procedure as Example 2 except that 6.0 g (as solid components) of each of the dispersed resin particles described in Table K shown below was used in place of the dispersed resin particles D-1, each of liquid developers was prepared.

TABLE K

| Example | Dispersed Resin Particles (D) |
| --- | --- |
| 19 | D-4 |
| 20 | D-6 |
| 21 | D-8 |
| 22 | D-9 |
| 23 | D-10 |
| 24 | D-12 |
| 25 | D-16 |
| 26 | D-17 |
| 27 | D-20 |
| 28 | D-3 |
| 29 | D-22 |
| 30 | D-24 |
| 31 | D-27 |
| 32 | D-39 |
| 33 | D-33 |
| 34 | D-36 |
| 35 | D-38 |
| 36 | D-28 |

Each of the liquid developers thus prepared was operated by the same manner as in Example 2 and the properties were determined.

Each of the liquid developers of Examples 19 to 32 showed a good result even after making 3,000 printing plates as in Example 2.

Furthermore, each of the liquid developers of Examples 33 to 36 using the dispersion obtained by the polymerization granulation of the monomer (A) of the present invention in the presence of a small amount of a monofunctional monomer having a long chain alkyl group copolymerizable with the foregoing monomer or a monofunctional monomer having at least two polar groups, had better properties and after making 3,500 printing plates, stains did not form on the developing apparatus and the images on the 3,500th printing plate had no stain and was clear.

As described above, each of the liquid developers of the present invention showed the good result.

Example 37

A mixture of 100 g of the white resin dispersion (D-23) described above and 3 g of Victoria Blue B was heated to a temperature of from 70° C. to 80° C. followed by stirring for 6 hours. After cooling to room temperature, the mixture was filtrated through a nylon cloth of 200 mesh to remove the remaining dye and to provide a blue resin dispersion having a mean particle size of 0.20 μm.

By diluting 5.5 g (as solid components) of the foregoing blue resin dispersion, 0.06 f of the polymer having the structure shown below, and 10 g of branched tetradecyl alcohol FOC-1400 (trade name, made by Nissan Chemical Industries, Ltd.) with one liter of Isopar G, a liquid developer for electrostatic photography was prepared.

Polymer:

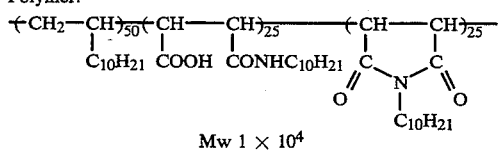

$\overline{M}w\ 1 \times 10^4$

When the liquid developer was operated by the same manner as in Example 1 and the formation of stains on the developing apparatus was evaluated, the developer showed the good result as in Example 1. Herein, an electrophotographic photoreceptor 8-2 was used.

Preparation of Electrophotographic Photoreceptor P-2

A mixture of 34 g of the binder resin (B-2) having the structure shown below, 6 g of the binder resin (B-3) having the structure shown below, 200 g of photoconductive zinc oxide, 0.2 g of phthalic anhydride, 0.01 g of phenol, 0.018 g of the cyanine dye (A) having the structure shown below, and 300 g of toluene was dispersed for 10 minutes using a homogenizer at a rotation number of $1 \times 10^4$ rpm to provide a dispersion for forming a photoconductive layer.

The dispersion was coated on a paper subjected to an electrically conductive treatment with a wire bar at dry coated amount of 25 g/m², dried at 100° C. for 20 seconds, and further heated to 120° C. for one hour. Then, the coated paper was allowed to stand for 24 hours in the dark at 20° C. and 65% RH to provide an electrophotographic photoreceptor P-2.

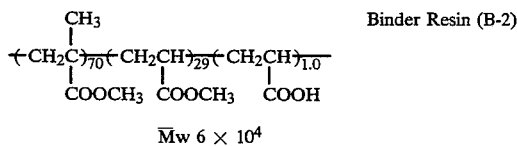

Binder Resin (B-2)

$\overline{M}w\ 6 \times 10^4$

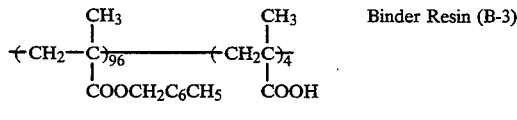

Binder Resin (B-3)

$\overline{M}w\ 8 \times 10^3$

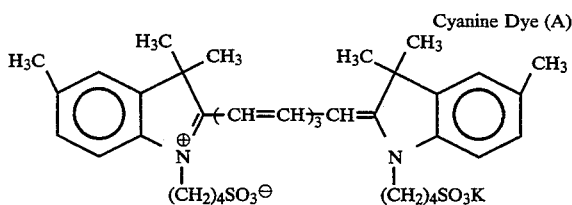

Cyanine Dye (A)

Then, after electrostatically charging an electrophotoreceptor P-2 prepared as shown above to −6 kV in the dark and exposing the surface of the photoreceptor using a gallium-aluminum-arsenic semiconductor laser of 2.0 mW (oscillation wavelength 780 nm) output as a light source under the exposure of 45 ergs/cm² at a pitch of 25 μm and a scanning speed of 300 meters/sec., the photoreceptor was developed using the liquid developer of the present invention prepared by the above procedure, thereafter, was rinsed through a rinse bath of an Isopar G liquid, and heated to 60° C. for 30 seconds to provide a toner image.

When the image of the printing plate after making 3,000 printing plates by repeating the plate-making process as described above was evaluated, copying paper having clear blue image without having background stains at the non-imaged portions could be obtained.

The nonaqueous resin dispersion of the present invention obtained by the photopolymerization process by the irradiation of ultraviolet rays having a wavelength of not longer than 400 nm is excellent in the dispersion stability and the redispersion stability as compared with a conventional nonaqueous resin dispersion by a polymerization granulation process using a polymerization initiator.

Also, when 3,000 printing plates were made using the nonaqueous resin dispersion of the present invention as the liquid developer, stains were not formed on the developing apparatus and the image on the 3,000th printing plate was clear. Furthermore, when printing was conducted using the 3,000th printing plate, excellent prints without having background stains on the non-imaged portions and lacking on the imaged portions were obtained.

While the invention has been described in detail and with reference to specific embodiments thereof, it will be apparent to one skilled in the art that various changes and modification can be made therein without departing from the spirit and scope thereof.

What is claimed is:

1. A liquid developer for electrostatic photography composed of a nonaqueous solvent having an electric resistance of at least $10^9$ Ω·cm and a dielectric constant of not higher than 3.5, having dispersed therein at least resin particles which are the nonaqueous resin dispersion obtained by a process which comprises subjecting to photopolymerization a system containing (i) at least a monomer (A) having one polymerizable double bond group, which is soluble in a nonaqueous solvent but is insolubilized by being polymerized, and (ii) at least a dispersion stabilizing resin (P) which is a polymer having a weight average molecular weight of from $1 \times 10^4$ to $1 \times 10^6$ and a repeating unit represented by formula (I) in an amount of at least 50% by weight based on the weight of the polymer, and having a functional group represented by formula (II) bonded to at least one of the side chain of the polymer and one terminal only of the main chain of the polymer, said photopolymerization reaction being carried out by irradiating the system with ultraviolet rays having a wavelength of not longer than 400 nm in the nonaqueous solvent:

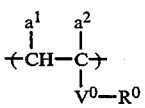

wherein $V^0$ is —COO—, —OCO—, —(CH$_2$)$_r$COO—, —(CH$_2$)$_r$OCO—, —O—, —CONHCOO—, —CONHCONH—, —COND$^{11}$—, —SO$_2$ND$^{11}$—, or a phenylene group, wherein $D^{11}$ is a hydrogen atom or a hydrocarbon group having from 1 to 22 carbon atoms and r represents an integer of from 1 to 4; $a^1$ and $a^2$, which may be the same or different, each is a hydrogen atom, a halogen atom, a cyano group a hydrocarbon group, —COO—$D^{12}$, or —COO—$D^{12}$ through a hydrocarbon group, wherein $D^{12}$ is a hydrocarbon group which may be substituted; and $R^0$ is an aliphatic group having from 8 to 32 carbon atoms;

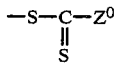  (II)

wherein $Z^0$ is —O—$R^1$ or —$NR^2(R^3)$, wherein $R^1$ is a monovalent organic residue in which the atom bonded to the oxygen atom is a carbon atom and $R^2$ and $R^3$, which may be the same or different, each is a hydrogen atom or a monovalent organic residue which is the same as $R^1$, with a proviso that $R^2$ and $R^3$ are not simultaneously a hydrogen atom.

2. The liquid developer as claimed in claim 1, wherein the dispersion stabilizing resin (P) further contains as a copolymerization component at least one kind of a monofunctional macromonomer (M) having a weight average molecular weight of from $1\times 10^3$ to $2\times 10^4$ having a polymerizable double bond group represented by formula (III) bonded to one terminal only of the main chain of the polymer having the repeating unit shown by formula (I):

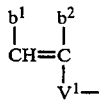  (III)

wherein $b^1$, $b^2$, and $V^1$ have the same meaning as $a^1$, $a^2$, and $V^0$ respectively in formula (I).

3. The liquid developer as claimed in claim 1, wherein the dispersion stabilizing resin (P) has the functional group of formula (II) in an amount of from 0.5 to 10 parts by weight per 100 parts by weight of the resin (P).

4. The liquid developer as claimed in claim 1, wherein the monomer (A) is represented by formula (IV)

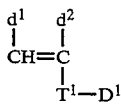  (IV)

wherein $T^1$ is —COO—, —OCO—, —$CH_2OCO$—, —$CH_2COO$—, —O—, —CONHCOO—, —CONHOCO—, —$SO_2$—, —$CON(W^1)$—, —$SO_2N(W^1)$—, or a phenylene group, wherein $W^1$ is a hydrogen atom or an aliphatic group having from 1 to 8 carbon atoms, which may be substituted; $D^1$ is a hydrogen atom, an alkyl group having from 1 to 6 carbon atoms, which may be substituted, or an aralkyl group having from 6 to 14 carbon atoms, which may be substituted; and $d^1$ and $d^2$, which may be the same or different, each has the same meanings as $a^1$ and $a^2$ in formula (I).

5. The liquid developer as claimed in claim 1, wherein the system further contains a monomer (C) represented by formula (V)

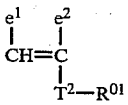  (V)

wherein $e^1$, $e^2$, and $T^2$ have the same meanings as $d^1$, $d^2$, and $T^1$ in formula (IV), respectively, and $R^{01}$ is an aliphatic group having 8 or more carbon atoms or a substituent selected from the substituents represented by formula (VI)

  (VI)

wherein $R^{21}$ is a hydrogen atom or an aliphatic group having from 1 to 18 carbon atoms; $B^1$ and $B^2$, which may be the same or different, each is —O—, —S—, —CO—, —$CO_2$—, —OCO—, —$SO_2$—, —$N(R^{22})$—, —$CON(R^{22})$—, —$N(R^{22})CO$—, —$N(R^{22})SO_2$—, —$SO_2N(R^{22})$—, —$NHCO_2$—, or —NHCONH—, wherein $R^{22}$ has the same meaning as $R^{21}$ described above; $A^1$ and $A^2$, which may be the same or different each is a hydrocarbon group having from 1 to 18 carbon atoms, which may be substituted or may have the moiety represented by formula (a) in the main chain bond:

  (a)

wherein $B^3$ and $B^4$, which may be the same or different, have the same meanings as $B^1$ and $B^2$ described above; $A^4$ is a hydrocarbon group having from 1 to 18 carbon atoms which may be substituted; $R^{23}$ has the same meaning as $R^{21}$ described above; and m, n, and p, which may be the same or different, each represents an integer of from 0 to 4, with a proviso that m, n, and p are not simultaneously 0.

6. The liquid developer as claimed in claim 1, which contains a coloring agent.

7. The liquid developer as claimed in claim 2, wherein the dispersion stabilizing resin (P) has the functional group of formula (II) in an amount of from 0.5 to 10 parts by weight per 100 parts by weight of the resin (P).

8. The liquid developer as claimed in claim 2, wherein the monomer (A) is represented by formula (IV)

  (IV)

wherein $T^1$ is —COO—, —OCO—, —$CH_2OCO$—, —$CH_2COO$—, —O—, —CONHCOO—, —CONHOCO—, —$SO_2$—, —$CON(W^1)$—, —$SO_2N(W^1)$—, or a phenylene group, wherein $W^1$ is a hydrogen atom or an aliphatic group having from 1 to 8 carbon atoms, which may be substituted; $D^1$ is a hydrogen atom, an alkyl group having from 1 to 6 carbon atoms, which may be substituted, or an aralkyl group having from 6 to 14 carbon atoms, which may be substituted; and $d^1$ and $d^2$, which may be the same or group having 8 or more carbon atoms or a substituent selected from the substituents represented by formula (VI)

  (VI)

wherein $R^{21}$ represents a hydrogen atom or an aliphatic group having from 1 to 18 carbon atoms; $B^1$ and $B^2$, which may be the same or different, each represents —O—, —S—, —CO—, —$CO_2$—, —OCO—, —$SO_2$—, —$N(R^{22})$—, —$CON(R^{22})$—, —$N(R^{22})CO$—, —$N(R^{22})SO_2$—, —$SO_2N(R^{22})$—, —$NHCO_2$—, or —NH- CONH— (wherein $R^{22}$ has the same meaning as $R^{21}$ described above); $A^1$ and $A^2$, which may be the same or different, each represents a hydrocarbon group having from 1 to 18 carbon atoms, which may be substituted or may have the moiety represented by formula (a) in the main chain bond:

$$-\underset{B^3+A^4-B^4\overline{)_p}R^{23}}{\overset{}{CH-}}$$ (a)

wherein $B^3$ and $B^4$, which may be the same or different, have the same meanings as $B^1$ and $B^2$ described above; $A^4$ represents a hydrocarbon group having from 1 to 18 carbon atoms which may be substituted; $R^{23}$ has the same meaning as $R^{21}$ described above; and m, n, and p, which may be the same or different, each represents an integer of from 0 to 4, with a proviso that m, n, and p are not simultaneously 0.

9. The liquid developer as claimed in claim 2, wherein the system further contains a monomer (C) represented by formula (V)

$$\underset{T^2-R^{01}}{\overset{e^1\ \ e^2}{\underset{|\ \ \ |}{CH=C}}}$$ (V)

wherein $e^1$, $e^2$, and $T^2$ have the same meanings as $d^1$, $d^2$, $T^1$ in formula (IV), respectively, and $R^{01}$ is an aliphatic group having 8 or more carbon atoms or a substituent selected from the substituents represented by formula (VI)

$$-A^1-B^1)_m(A^2-B^2)_nR^{21}$$ (VI)

wherein $R^{21}$ is a hydrogen atom or an aliphatic group having from 1 to 18 carbon atoms; $B^1$ and $B^2$, which may be the same or different, each is —O—, —S—, —CO—, —CO$_2$—, —OCO—, —SO$_2$—, —N($R^{22}$)—, —CON($R^{22}$)—, —N($R^{22}$)CO—, —N($R^{22}$)SO$_2$—, —SO$_2$N($R^{22}$)—. —NHCO$_2$—, or —NHCONH—, wherein $R^{22}$ has the same meaning as $R^{21}$ described above; $A^1$ and $A^2$, which may be the same or different, each is a hydrocarbon group having from 1 to 18 carbon atoms, which may be substituted or may have the moiety represented by formula (a) in the main chain bond;

$$-\underset{B^3+A^2-B^4\overline{)_p}R^{23}}{\overset{}{CH-}}$$ (a)

wherein $B^3$ and $B^4$, which may be the same or different have the same meanings as $B^1$ and $B^2$ described above; $A^4$ is a hydrocarbon group having from 1 to 18 carbon atoms which may be substituted; $R^{23}$ has the same meaning as $R^{21}$ described above; and m, n, and p, which may be the same or different, each represents an integer of from 0 to 4, with a proviso that m, n, and p are not simultaneously 0.

10. The liquid developer as claimed in claim 2, which contains a coloring agent.

* * * * *